United States Patent
Goto et al.

(10) Patent No.: US 11,003,734 B2
(45) Date of Patent: May 11, 2021

(54) CALCULATING DEVICE, CALCULATION PROGRAM, RECORDING MEDIUM, AND CALCULATION METHOD

(71) Applicant: KABUSHIKI KAISHA TOSHIBA, Tokyo (JP)

(72) Inventors: Hayato Goto, Kanagawa (JP); Taro Kanao, Kanagawa (JP); Kosuke Tatsumura, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 149 days.

(21) Appl. No.: 16/282,688

(22) Filed: Feb. 22, 2019

(65) Prior Publication Data
US 2020/0089473 A1   Mar. 19, 2020

(30) Foreign Application Priority Data
Sep. 14, 2018 (JP) .............. JP2018-172891

(51) Int. Cl.
*G06F 17/13* (2006.01)
*G06F 17/11* (2006.01)

(52) U.S. Cl.
CPC .............. *G06F 17/13* (2013.01); *G06F 17/11* (2013.01)

(58) Field of Classification Search
CPC ........................ G06F 17/11–13; G06F 7/544
See application file for complete search history.

(56) References Cited

U.S. PATENT DOCUMENTS

| 2017/0104493 | A1 | 4/2017 | Goto | |
|---|---|---|---|---|
| 2019/0266212 | A1* | 8/2019 | Goto | G06F 17/11 |
| 2020/0090066 | A1* | 3/2020 | Kanao | G06F 17/18 |

FOREIGN PATENT DOCUMENTS

JP        2017-73106 A      4/2017

OTHER PUBLICATIONS

K. Tatsumura, A. R. Dixon, and H. Goto, "FPGA-based Simulated Bifurcation Machine", 29th International Conference on Field Programmable Logic and Applications (FPL), 2019 (Year: 2019).*

(Continued)

*Primary Examiner* — Matthew D Sandifer
(74) *Attorney, Agent, or Firm* — Finnegan, Henderson, Farabow, Garrett & Dunner L.L.P.

(57) ABSTRACT

According to one embodiment, a calculating device includes a processor repeating a processing procedure. The processing procedure includes a first variable update and a second variable update. The first variable update includes updating a first variable $x_i$ by adding a first function to the first variable $x_i$ before the first variable update. The second variable update includes updating the second variable $y_i$ by adding a second function and a third function to the second variable $y_i$ before the second variable update. A variable of the first function set includes a calculation parameter. The calculation parameter is different before and after the processing procedure. The processor performs at least an output of at least one of the first variable $x_i$ obtained after the repeating of the processing procedure or a function of the first variable $x_i$ obtained after the repeating of the processing procedure.

20 Claims, 12 Drawing Sheets

(56) References Cited

OTHER PUBLICATIONS

H. Goto, K. Tatsumura, and A. R. Dixon, "Combinatorial optimization by simulating adiabatic bifurcations in nonlinear Hamiltonian systems," Science Advances 5, eaav2372, 2019 (Year: 2019).*

Inagaki et al., "A coherent Ising machine for 2000-node optimization problems," Science, 354:603-606 (Nov. 2016).

Goto, "Bifurcation-bases adiabatic quantum computation with a nonlinear oscillator network," Scientific Reports, pp. 8 (Feb. 22, 2016).

Haribara at al., "Performance evaluation of coherent Ising machines against classical neural networks," Quantum Sci. Technol., 2:1-8 (Aug. 14, 2017).

* cited by examiner

CALCULATING DEVICE, CALCULATION PROGRAM, RECORDING MEDIUM, AND CALCULATION METHOD

CROSS-REFERENCE TO RELATED APPLICATIONS

This application is based upon and claims the benefit of priority from Japanese Patent Application No. 2018-172891, filed on Sep. 14, 2018; the entire contents of which are incorporated herein by reference.

FIELD

Embodiments described herein relate generally to a calculating device, a calculation program, a recording medium, and a calculation method.

BACKGROUND

Optimization problems appear in various social issues. Ising problems are one example of optimization problems. It is desirable to solve large-scale optimization problems quickly.

DETAILED DESCRIPTION

Figure 1:
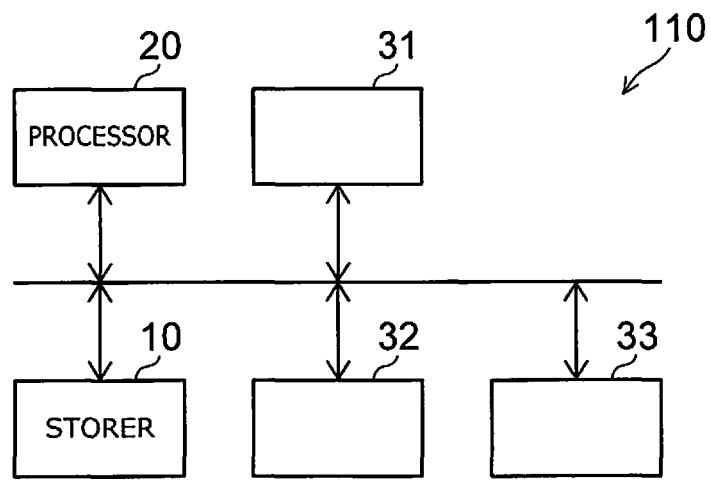
FIG. 1 is a schematic view showing an example of a calculating device according to an embodiment.

According to one embodiment, a calculating device includes a processor is configured to perform repeating a processing procedure. The processing procedure includes a first variable update and a second variable update. The first variable update includes updating an ith entry of a first variable $x_i$ by adding an ith entry of a first function to the ith entry of the first variable $x_i$ before the first variable update (i is an integer not less than 1 and not more than N, and N is an integer of 2 or more). The ith entry of the first variable $x_i$ is one of a first variable set $\{x\}$. A variable of the ith entry of the first function includes an ith entry of a second variable $y_i$. The ith entry of the second variable $y_i$ is one of a second variable set $\{y\}$. The ith entry of the first function is one of a first function set. The second variable update includes updating the ith entry of the second variable $y_i$ by adding an ith entry of a second function and an ith entry of a third function to the ith entry of the second variable $y_i$ before the second variable update. A variable of the ith entry of the second function includes the ith entry of the first variable $x_i$. A variable of the ith entry of the third function includes at least a part of a first parameter set $\{J\}$ and at least a part of the first variable set $\{x\}$. The ith entry of the second function is one of a second function set. The ith entry of the third function is one of a third function set. A variable of the first function set includes a calculation parameter. The calculation parameter is different before and after the processing procedure. The processor is configured to perform at least an output of at least one of the ith entry of the first variable $x_i$ obtained after the repeating of the processing procedure or a function of the ith entry of the first variable $x_i$ obtained after the repeating of the processing procedure.

According to another embodiment, a calculation program causes a computer to perform repeating a processing procedure. The processing procedure includes a first variable update and a second variable update. The first variable update includes updating an ith entry of a first variable $x_i$ by adding an ith entry of a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the ith entry of the first function includes an ith entry of a second variable $y_i$. The ith entry of the second variable $y_i$ is one of a second variable set $\{y\}$. The ith entry of the first function is one of a first function set. The second variable update includes updating the ith entry of the second variable $y_i$ by adding an ith entry of a second function and an ith entry of a third function to the ith entry of the second variable $y_i$ before the second variable update. A variable of the ith entry of the second function includes the ith entry of the first variable $x_i$. A variable of the ith entry of the third function includes at least a part of a first parameter set $\{J\}$ and at least a part of the first variable set $\{x\}$. The ith entry of the second function is one of a second function set. The ith entry of the third function is one of a third function set. A variable of the first function set includes a calculation parameter. The calculation parameter is different before and after the processing procedure. The computer is caused to output at least one of the ith entry of the first variable $x_i$ obtained after the repeating of the processing procedure or a function of the ith entry of the first variable $x_i$ obtained after the repeating of the processing procedure.

According to another embodiment, a recording medium is computer-readable. A calculation program is recorded in the recording medium. The calculation program causes a computer to perform repeating a processing procedure. The processing procedure includes a first variable update and a second variable update. The first variable update includes updating an ith entry of a first variable $x_i$ by adding an ith entry of a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the ith entry of the first function includes the ith entry of the second variable $y_i$. The ith entry of the second variable $y_i$ is one of a second variable set $\{y\}$. The ith entry of the first function is one of a first function set. The second variable update includes updating the ith entry of the second variable $y_i$ by adding an ith entry of a second function and an ith entry of a third function to the ith entry of the second variable $y_i$ before the second variable update. A variable of the ith entry of the second function includes the ith entry of the first variable X. A variable of the ith entry of the third function includes at least a part of a first parameter set $\{J\}$ and at least a part of the first variable set $\{x\}$. The ith entry of the second function is one of a second function set. The ith entry of the third function is one of a third function set. A variable of the first function set includes a calculation parameter. The calculation parameter is different before and after the processing procedure. The computer is caused to output at least one of the ith entry of the first variable $x_i$ obtained after the repeating of the processing procedure or a function of the ith entry of the first variable $x_i$ obtained after the repeating of the processing procedure.

According to another embodiment, a calculation method includes repeating a processing procedure. The processing procedure includes a first variable update and a second variable update. The first variable update includes updating an ith entry of a first variable $x_i$ by adding an ith entry of a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the ith entry of the first function includes the ith entry of the second variable $y_i$. The ith entry of the second variable $y_i$ is one of a second variable set $\{y\}$. The ith entry of the first function is one of a first function set. The second variable update includes updating the ith entry of the second variable $y_i$ by adding an ith entry of a second function and an ith entry of a third function to the ith entry of the second variable $y_i$ before the second variable update. A variable of the ith entry of the second function includes the ith entry of the first variable $x_i$. A variable of the ith entry of the third function includes at least a part of a first parameter set $\{J\}$ and at least a part of the first variable set $\{x\}$. The ith entry of the second function is one of a second function set. The ith entry of the third function is one of a third function set. A variable of the first function set includes a calculation parameter. The calculation parameter is different before and after the processing procedure. The calculation method includes outputting at least one of the ith entry of the first variable $x_i$ obtained after the repeating of the processing procedure or a function of the ith entry of the first variable $x_i$ obtained after the repeating of the processing procedure.

Various embodiments are described below with reference to the accompanying drawings.

In the specification and drawings, components similar to those described previously or illustrated in an antecedent drawing are marked with like reference numerals, and a detailed description is omitted as appropriate.

First Embodiment

FIG. 1 is a schematic view showing an example of a calculating device according to an embodiment.

As shown in FIG. 1, the calculating device 110 according to the embodiment includes, for example, a processor 20 and a storer 10. The processor 20 includes, for example, a CPU (Central Processing Unit), etc. The processor 20 includes, for example, an electronic circuit, etc. The storer 10 can store various data. The storer 10 is, for example, memory. The storer 10 may include at least one of ROM (Read Only Memory) or RAM (Random Access Memory). The calculating device 110 may be a calculation system.

In the example, an acquirer 31 is provided in the calculating device 110. For example, the acquirer 31 can acquire various data. The acquirer 31 includes, for example, an I/O port, etc. The acquirer 31 may have the function of an outputter. For example, the acquirer 31 may have communication functions.

As shown in FIG. 1, the calculating device 110 may include an operation part 32, a displayer 33, etc. The operation part 32 may include, for example, a device having an operation function (e.g., a keyboard, a mouse, a touch input panel, a voice recognition input device, etc.). The displayer 33 may include various displays.

The multiple components that are included in the calculating device 110 can communicate with each other by at least one of a wireless or wired method. The locations where the multiple components included in the calculating device 110 are provided may be different from each other. For example, a general-purpose computer may be used as the calculating device 110. For example, multiple computers that are connected to each other may be used as the calculating device 110. A dedicated circuit may be used as at least a part of the calculating device 110 (e.g., the processor 20, the storer 10, etc.). For example, multiple circuits that are connected to each other may be used as the calculating device 110.

Examples of the multiple components included in the calculating device 110 are described below.

An example of an operation performed by the calculating device 110 according to the embodiment will now be described.

Figure 2:
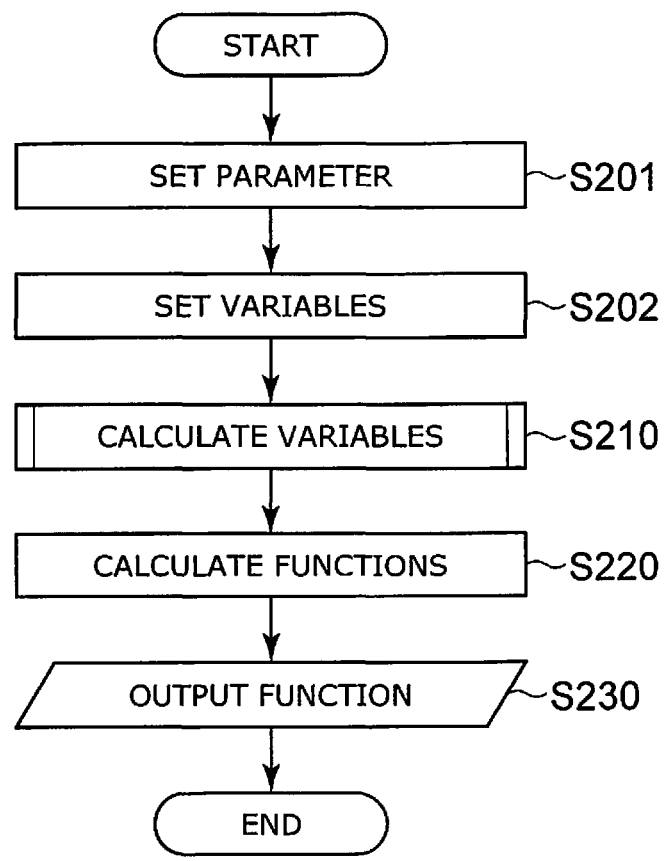
FIG. 2 is a flowchart illustrating the operation of the calculating device according to the embodiment.

FIG. 2 is a flowchart illustrating the operation of the calculating device according to the embodiment.

As shown in FIG. 2, a parameter is set (step S201). The parameter includes, for example, a first parameter set $\{J\}$. The parameter may further include, for example, a second parameter set $\{h\}$. Examples of these parameters are described below.

Multiple variables are set (step S202). The variables include, for example, a first variable set $\{x\}$ and a second variable set $\{y\}$. The variables are initialized to appropriate values in step S202. Examples of the initialization are described below.

Calculations (e.g., updating) of the multiple variables are performed (step S210). For example, the time evolution is calculated for the multiple variables. For example, the first variable set $\{x\}$ is updated; and the second variable set $\{y\}$ is updated. These calculations are repeated until the prescribed conditions (described below) are satisfied. Step S210 is, for example, a subroutine.

After the subroutine (the update of the variables), for example, a function is calculated (step S220). For example, a function of at least one element included in the first variable set $\{x\}$ is calculated. In one example, this function is the sign of at least one element included in the first variable set $\{x\}$.

This function is output (step S230). For example, in one example, the sign of at least one element included in the first variable set $\{x\}$ is output. In step S230, at least one element included in the first variable set $\{x\}$ after the update may be output. In such a case, step S220 may be omitted.

In the embodiment, in the above calculations of the multiple variables (step S210), for example, the update of the first variable set $\{x\}$ is performed using the second variable set $\{y\}$. Then, the update of the second variable set {y} is performed using the first variable set {x}. These updates are performed multiple times. In one example, in one of the multiple updates, the update of the second variable set {y} is performed after the update of the first variable set {x}. In one other example, for example, in one of the updates of the multiple times, the update of the first variable set {x} is performed after the update of the second variable set {y}.

An optimization problem can be calculated quickly by the calculating device 110. The optimization problem is, for example, a combinatorial optimization problem (e.g., a discrete optimization problem). For example, a large-scale Ising problem can be solved quickly.

An Ising problem will now be described as an example of a calculation performed by the calculating device 110.

For example, an Ising energy $E_{Ising}$ is represented by the following first formula.

$$E_{Ising} = -\frac{1}{2}\sum_{i=1}^{N}\sum_{j=1}^{N} J_{i,j} s_i s_j + \sum_{i=1}^{N} h_i s_i \qquad (1)$$

In the first formula, "N" is the number of Ising spins. "$s_i$" is the ith Ising spin. For example, "$s_i$"=±1. "J" is, for example, one matrix. One example of the first parameter set {J} above is a matrix J. The matrix J is a real symmetric matrix. In the real symmetric matrix, all of the diagonal entries (the diagonal elements) are zero.

A classical model of a quantum bifurcation machine (hereinbelow, called a classical bifurcation machine) is proposed for the first formula recited above. The equations of motion for the classical bifurcation machine are provided by the following second to fourth formulas.

$$\frac{dx_i}{dt} = \frac{\partial H}{\partial y_i} = y_i\{D + p(t) + K(x_i^2 + y_i^2)\} - c\sum_{j=1}^{N} J_{i,j} y_j \qquad (2)$$

$$\frac{dy_i}{dt} = -\frac{\partial H}{\partial x_i} = x_i\{-D + p(t) - K(x_i^2 + y_i^2)\} - ch_i a(t) + c\sum_{j=1}^{N} J_{i,j} x_j \qquad (3)$$

$$H = \sum_{i=1}^{N}\left[\frac{D}{2}(x_i^2 + y_i^2) - \frac{p(t)}{2}(x_i^2 - y_i^2) + \frac{K}{4}(x_i^2 + y_i^2)^2 + ch_i x_i a(t) - \frac{c}{2}\sum_{j=1}^{K} J_{i,j}(x_i x_j + y_i y_j)\right] \qquad (4)$$

In the second to fourth formulas, "N" corresponds to, for example, the number of Ising spins. For example, "D" corresponds to "detuning." "c" is a constant. For example, "p" corresponds to the "pump rate." For example, "K" corresponds to the "Kerr coefficient." For example, these values may be preset. The second parameter set {h} may not be provided in the second to fourth formulas. In such a case, the terms that include elements of {h} in the third formula and the fourth formula are ignored.

In the second to fourth formulas recited above, the sign "±1" of the final value of "$x_i$" becomes the Ising spin "$s_i$" of the optimal solution (the ground state) when p(t) is increased from zero to a sufficiently large value. "a(t)" is a parameter that increases with "p(t)." For example, "a(t)" is represented by the following fifth formula.

$$a(t) = \sqrt{p(t)/K} \qquad (5)$$

The above classical bifurcation machine can be considered to be a Hamiltonian dynamical system described by the second to fourth formulas in which "H" is the Hamiltonian.

On the other hand, simulated annealing is known. A sequential update algorithm is employed in this method. In the sequential update algorithm, multiple spins are updated one by one at a time. Such a sequential update algorithm is not suitable for parallel computation.

On the other hand, the equations of motion for the classical bifurcation machine recited above can be solved by discrete solution methods using digital computers. This algorithm is different from simulated annealing and is a parallel update algorithm. Multiple variables can be updated simultaneously in the parallel update algorithm. Therefore, speedup by parallel computation can be expected.

However, the approach that uses the second to fifth formulas recited above has the following problems. A calculation that uses the matrix J, which is the most computation-intensive, is necessary to update both the first variable x and the second variable y. Because the above equations of motion cannot be numerically solved easily, for example, it is necessary to use a discrete solution method (e.g., a fourth-order Runge-Kutta method, etc.) requiring a large calculation amount.

On the other hand, in the embodiment, for example, instead of the simultaneous ordinary differential equations shown in the second to fourth formulas, the simultaneous ordinary differential equations shown in the following sixth to eighth formulas are used.

$$H' = F(y_B, t) + \sum_{i=1}^{N}\left[\frac{D}{2}x_i^2 - \frac{p(t)}{2}x_i^2 + \frac{K}{4}x_i^4 + ch_i x_i a(t) - \frac{c}{2}\sum_{j=1}^{N} J_{i,j} x_i x_j\right] \qquad (6)$$

$$\frac{dx_i}{dt} = \frac{\partial H'}{\partial y_i} = \frac{\partial F(y_B, t)}{\partial y_i} = f_i(y_B, t) \qquad (7)$$

$$\frac{dy_i}{dt} = -\frac{\partial H'}{\partial x_i} = -Dx_i + p(t)x_i - Kx_i^3 - ch_i a(t) + c\sum_{j=1}^{N} J_{i,j} x_j \qquad (8)$$

"$y_B$" recited above corresponds to all of the elements included in the second variable set {y} (e.g., the first entry of the second variable $y_1$ to the Nth entry of the second variable $y_N$). "$f_i(y_B, t)$" is a function of an ith entry of a second variable $y_i$.

As shown in the seventh formula, a first variable update updates an ith entry of a first variable $x_i$ by adding an ith entry of a first function to the ith entry of the first variable $x_i$ before the first variable update. The ith entry of the first function is "$f_i(y_B, t)$." The ith entry of the first function is one of a first function set.

In a first calculation method (a first calculating device), the following formulas are used as "$f_i(y_B, t)$." In such a case, the seventh formula is represented by the tenth formula.

$$F(y_B, t) = \frac{D}{2}\sum_{i=1}^{N} y_i^2 \qquad (9)$$

$$\frac{dx_i}{dt} = \frac{\partial F(y_B, t)}{\partial y_i} = f_i(y_B, t) = Dy_i \qquad (10)$$

Accordingly, in the first calculation method (the first calculating device), the update of the first variable x is performed based on the tenth formula recited above. Then, the update of the second variable y is performed based on the eighth formula recited above. In the first calculation method as shown in the tenth formula, the variable of the ith entry of the first function includes the product of the parameter "D" and "$y_i$."

In a second calculation method (a second calculating device), the following formulas are used as "$f_i(y_B, t)$." In such a case, the seventh formula is represented by the twelfth formula.

$$F(y_B, t) = \frac{R(t)}{2}\sum_{i=1}^{N} y_i^2 \quad (11)$$

$$\frac{dx_i}{dt} = \frac{\partial F(y_B, t)}{\partial y_i} = f_i(y_B, t) = R(t)y_i \quad (12)$$

Accordingly, in the second calculation method (the second calculating device), the update of the first variable x is performed based on the twelfth formula recited above. Then, the update of the second variable y is performed based on the eighth formula recited above. In the second calculation method, the variable of the ith entry of the first function includes the product of the ith entry of the second variable $y_i$ and a first calculation parameter R(t).

Figure 3:
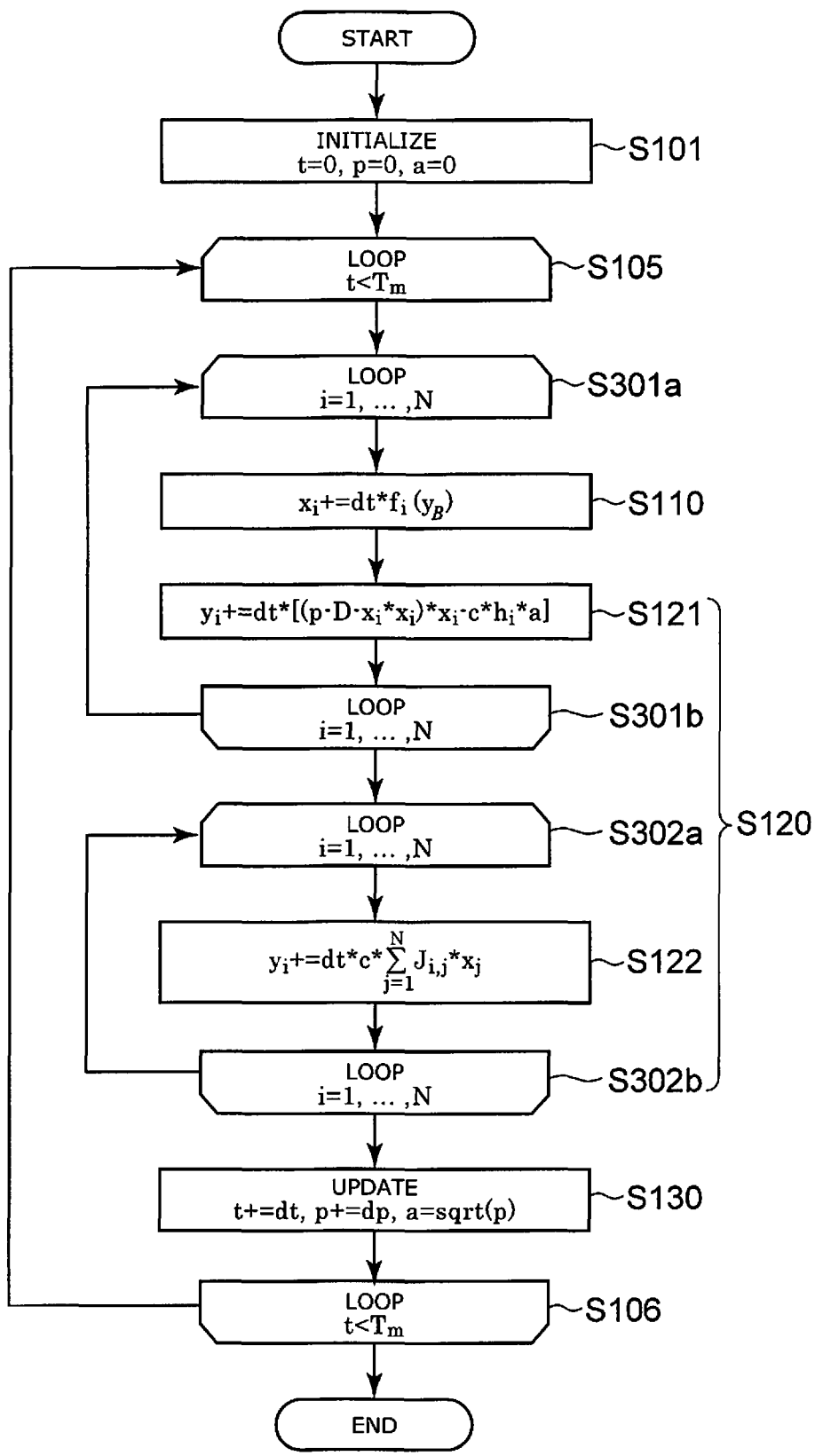
FIG. 3 is a flowchart illustrating a part of the operation of the calculating device according to the embodiment.

In one example (e.g., the example of FIG. 3 described below), the "processing procedure" includes step S110, step S120, and step S130. The "processing procedure" includes, for example, the loop processing over "i" of step S110, step S120, and step S130. The "processing procedure" is repeated multiple times. The first calculation parameter R(t) is updated when the processing procedure is repeated. In the example of FIG. 3, the first calculation parameter R(t) is updated in step S130.

For example, the first calculation parameter R(t) decreases monotonously as the processing procedure is repeated. For example, the first calculation parameter R(t) after the processing procedure is smaller than the first calculation parameter R(t) before the processing procedure.

In a third calculation method (a third calculating device), the following formulas are used as "$f_i(y_B, t)$."

$$F(y_B, t) = \frac{G(t)}{4}\sum_{l=1}^{L_s} N_l(\langle y^2\rangle_l - T(t))^2 \quad (13)$$

$$\langle y^2\rangle_l = \frac{1}{N_l}\sum_j y_j^2 \quad (14)$$

Here, the seventh formula is represented by the fifteenth formula.

$$\frac{dx_i}{dt} = \frac{\partial F(y_B, t)}{\partial y_i} = f_i(y_B, t) = G(t)y_i(\langle y^2\rangle_l - T(t)) \quad (15)$$

Accordingly, in the third calculation method (the third calculating device), the update of the first variable x is performed based on the fifteenth formula recited above. Then, the update of the second variable y is performed based on the eighth formula recited above.

For example, the set of 1 to N is split into multiple subsets not having intersections. The number of multiple subsets is "$N_s$." The number of elements included in each of the multiple subsets is "$N_l$." The sum over "j" of the fourteenth formula is performed in the case where "j" is included in "$S_i$." "$S_i$" corresponds to the "ith" entry of the partial set. "$N_l$" is the number of elements of "$S_i$" (the number of elements included in "$S_i$"). In the fourteenth formula, $\langle y^2\rangle_i$ shows the mean square of the second variable y corresponding to the numeral included in "$S_i$" which is one of the multiple subsets.

As shown in the fifteenth formula, the variable of the ith entry of the first function that is used in the update of the first variable x includes the difference between a second calculation parameter T(t) and the mean square of at least a part of the second variable set {y}. At least a part of the second variable set {y} recited above includes the ith entry of the second variable $y_i$.

For example, the variable of the ith entry of the first function includes the product of the ith entry of the second variable $y_i$, a third calculation parameter G(t), and the difference between the second calculation parameter T(t) and the mean square of at least a part of the second variable set {y}. For example, the second calculation parameter T(t) after the processing procedure is not more than the second calculation parameter T(t) before the processing procedure. For example, the third calculation parameter G(t) after the processing procedure is not more than the third calculation parameter G(t) before the processing procedure.

For example, the second calculation parameter T(t) is a constant or decreases monotonously as the processing procedure is repeated. For example, the third calculation parameter G(t) is a constant or decreases monotonously as the processing procedure is repeated.

For example, the second calculation parameter T(t) after the processing procedure is not more than the second calculation parameter T(t) before the processing procedure. For example, the second calculation parameter T(t) after one loop is not more than the second calculation parameter T(t) before the one loop.

For example, the third calculation parameter G(t) after the processing procedure is smaller than the third calculation parameter G(t) before the processing procedure. For example, the third calculation parameter G(t) after one loop is smaller than the third calculation parameter G(t) before the one loop.

In the sixth to fifteenth formulas, for example, "N" corresponds to the number of Ising spins. For example, "D" corresponds to "detuning." "c" is a constant. For example, "p" corresponds to the "pump rate" (e.g., an operation parameter). For example, "K" corresponds to the "Kerr coefficient." For example, these values may be preset. The second parameter set {h} may not be provided in the sixth to fifteenth formulas. In such a case, the term that includes the element of {h} in the eighth formula is ignored.

A product-sum operation that relates to the matrix J, which is the most computation-intensive, is performed only in the update of the second variable y and is not performed in the update of the first variable x. Accordingly, the calculation amount is reduced. In these formulas, the time derivative of the first variable x includes the second variable y. For example, the time derivative of the first variable x does not include the first variable x. The time derivative of the second variable y includes the first variable x. For example, the time derivative of the second variable y does not include the second variable y. x and y are separate from each other in the Hamiltonian. Therefore, a stable discrete solution method in which the calculation amount is small is applicable. For example, a method called a symplectic Euler method is applicable. In the sixth to fifteenth formulas recited above, "p" is eliminated from the time derivative of "x."

It was found that high performance (e.g., high accuracy) can be maintained using such a method. In the calculating device according to the embodiment, the equations of motion for the Hamiltonian dynamical system (a new classical bifurcation machine) with the above separable Hamiltonian is solved using, for example, a symplectic Euler method. The calculating device according to the embodiment is configured to perform the calculation of such a new algorithm as quickly as possible by parallel computation.

In the embodiment, for example, the sign ("±1") of the final value of the first variable $x_i$ becomes the Ising spin $s_i$ of the optimal solution (the ground state) when "p(t)" is increased from zero to a sufficiently large value.

For example, the first variable $x_i$ and the second variable $y_i$ are initialized to appropriate values in the setting of the variables (step S202). For example, these variables are initialized randomly using random numbers having absolute values of 0.1 or less.

Several examples of step S210 (referring to FIG. 2) will now be described.

FIG. 3 is a flowchart illustrating a part of the operation of the calculating device according to the embodiment.

FIG. 3 illustrates step S210. The formulas shown in FIG. 3 are examples. As shown in FIG. 3, "t," "p," and "a" are initialized (step S101). In one example, "t," "p," and "a" are set to 0. "$T_m$" corresponds to the final value of a time t. "dt" is the increment per step of the time t. "dp" is the increment per step of the parameter p.

In the example of FIG. 3, the processing between step S105 and step S106 corresponds to one loop. When "t" is smaller than "$T_m$," the "processing procedure" that includes the series of processing described below is repeated (step S105). For example, the "processing procedure" may be repeated when "p" is smaller than "P" that is preset appropriately. For example, the "processing procedure" includes the loop processing over "i" (step S301a and step S301b).

The update of the ith entry of the first variable $x_i$ is performed (step S110). For example, in the first calculation method (the first calculating device), the value that is obtained by adding dt*D*$y_i$ (referring to the tenth formula) to the first variable $x_i$ before the update is used as the first variable $x_i$ after the update. Here, "*" is the product symbol.

In the second calculation method (the second calculating device), the value that is obtained by adding dt*R(t)*yi (referring to the twelfth formula) to the first variable x; before the update is used as the first variable $x_i$ after the update.

In the third calculation method (the third calculating device), the value that is obtained by adding dt*G(t)*$y_i$ ($<y^2>_i$−T(t)) (referring to the fifteenth formula) to the first variable $x_i$ before the update is used as the first variable $x_i$ after the update.

The ith entry of the second variable $y_i$ is updated (step S120). In the example, the update based on the first variable set {x} (step S121) and the update based on the first parameter set {J} and the first variable set {x} (step S122) is performed. The order of step S121 and step S122 is interchangeable. At least a part of step S121 and at least a part of step S122 may be performed simultaneously. For example, step S121 corresponds to a first sub-update. Step S122 corresponds to a second sub-update. Step S121 is performed in the loop processing over "i" (step S301a and step S301b). Step S122 is performed in the loop processing over "i" (step S302a and step S302b).

In the first sub-update, for example, the value that is obtained by adding dt*((p−D−$x_i$*$x_i$)*$x_i$−c*$h_i$*a) to the second variable $y_i$, before the update is used as the second variable $y_i$ after the update.

In the second sub-update, for example, the value that is obtained by adding dt*c*Σ($J_{i,j}$*$x_j$) to the second variable $y_i$ before the update is used as the second variable $y_i$ after the update. "Σ" illustrates the sum over j. For example, "dt*c*J" may be used as the J matrix. In such a case, the arithmetic of "dt*c*" may not actually be performed.

Update processing of the parameters for the updating is performed (step S130). Namely, the value that is obtained by adding "dt" to "t" before the update is used as "t" after the update. The value that is obtained by adding "dp" to "p" before the update is used as "p" after the update. "a" is, for example, $p^{1/2}$.

Then, the flow returns to step S105 when "t" is smaller than "$T_m$" (step S106). For example, the flow may return to step S105 when "p" is smaller than "P" which is preset appropriately.

When "t" is not less than "$T_m$," the update ends; and the flow proceeds to step S220 or step S230 shown in FIG. 2.

In the case where the first calculation parameter R(t) is used, for example, the first calculation parameter R(t) is performed in step S130. In the case where the second calculation parameter T(t) is used, for example, the update of the second calculation parameter T(t) is performed in step S130. In the case where the third calculation parameter G(t) is used, for example, the update of the third calculation parameter G(t) is performed in step S130.

Figure 4:
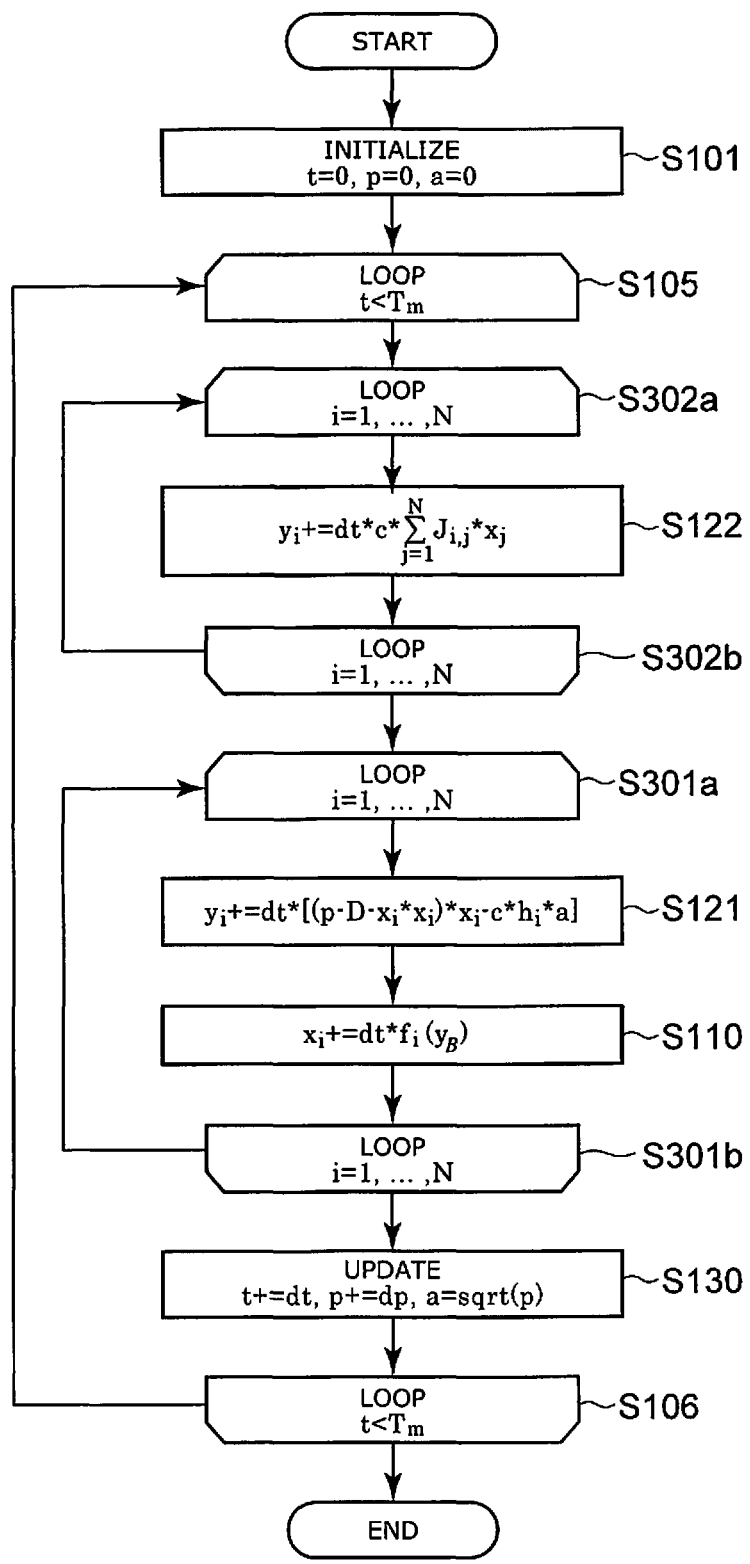
FIG. 4 is a flowchart illustrating a part of the operation of the calculating device according to the embodiment.

FIG. 4 is a flowchart illustrating a part of the operation of the calculating device according to the embodiment.

FIG. 4 illustrates step S210. In one repeated processing in the example shown in FIG. 4, step S120 (referring to FIG. 3) is performed before step S110. Thus, the order of step S110 and step S120 is arbitrary.

In one example, "K" is set to 1. For example, "N," "D," "c," "$T_m$," "dt," and "dp" can be preset to the appropriate values.

In the examples of FIG. 3 and FIG. 4, a linear increase is applied to the update of "p." In the embodiment, any increasing function may be used to update "p." The embodiment includes two types of update methods as recited above. Namely, in one update method, after the update of the first variable $x_i$, the second variable $y_i$ is updated using the updated first variable $x_i$. In another update method, after the update of the second variable $y_i$, the first variable $x_i$ is updated using the updated second variable $y_i$. These two methods correspond respectively to FIG. 3 and FIG. 4.

Thus, in the calculating device 110 according to the embodiment, the processor 20 (referring to FIG. 1) repeats the processing procedure (step S210: referring to FIG. 2). The processing procedure includes, for example, the first variable update (step S110) and the second variable update (step S120).

The first variable update includes updating the ith entry of the first variable $x_i$ by adding the ith entry of the first function to the ith entry of the first variable $x_i$ before the first variable update (i being an integer not less than 1 and not more than N, and N being an integer of 2 or more). The ith entry of the first variable $x_i$ is one of the first variable set {x}. The variable of the ith entry of the first function includes the ith entry of the second variable $y_i$. The ith entry of the second variable $y_i$ is one of the second variable set {y}. The ith entry of the first function is one of the first function set.

The second variable update includes updating the ith entry of the second variable $y_i$ by adding the ith entry of the second function and the ith entry of the third function to the ith entry of the second variable $y_i$ before the second variable update. The variable of the ith entry of the second function includes the ith entry of the first variable $x_i$. The variable of the ith entry of the third function includes at least a part of the first parameter set {J} and at least a part of the first variable set {x}. The ith entry of the second function is one of the second function set. The ith entry of the third function is one of a third function set.

Then, the processor 20 outputs at least one of the ith entry of the first variable $x_i$ obtained after repeating the processing procedure or a function of the ith entry of the first variable $x_i$ obtained after repeating the processing procedure which are recited above. For example, at least one of any first variable included in the first variable set {x} or a function of any first variable obtained after repeating the processing procedure is output. For example, at least one of all of the first variables included in the first variable set {x} or each function of all of the first variables obtained after repeating the processing procedure may be output.

In the embodiment, the first function (the first function set) recited above is independent of the first variable set {x}. The value of the result of the first function (the first function set) does not change even when the value of the first variable set {x} is modified. The second function (the second function set) recited above is independent of the second variable set {y}. The value of the result of the second function (the second function set) does not change even when the value of the second variable set {y} is modified. The third function (the third function set) recited above is independent of the second variable set {y}. The value of the result of the third function (the third function set) does not change even when the value of the second variable set {y} is modified.

In the first calculation method (the first calculating device), the ith entry of the first function is, for example, $dt*D*y_i$ (e.g., referring to the tenth formula). In the second calculation method (the second calculating device), the ith entry of the first function is, for example, $dt*R(t)*y_i$ (e.g., referring to the twelfth formula). In the third calculation method (the third calculating device), the ith entry of the first function is, for example, $dt*G(t)*y_i$ ($<y^2>_i-T(t)$) (e.g., referring to the fifteenth formula). In the second calculation method and the third calculation method, the variable of the ith entry of the first function is different before and after the processing procedure. In the second calculation method and the third calculation method, for example, the calculation parameter that is included in the first function (the first function set) is different before and after the processing procedure.

In the embodiment, the variable of the ith entry of the first function may include at least one of $dt*R(t)*y_i$ (a first product) or $dt*G(t)*y_i$ ($<y^2>_i-T(t)$) (a second product).

The second function is, for example, $dt*((p-D-x_i*x_i)*x_i-c*h_i*a)$ (e.g., referring to FIG. 3). The third function is, for example, $dt*c*\Sigma(J_{i,j}*x_j)$ (e.g., referring to FIG. 3).

In the embodiment, the second variable update may be performed after the first variable update in one of the processing procedures recited above performed repeatedly. Or, the first variable update may be performed after the second variable update.

The algorithm that is performed by the calculating device according to the embodiment includes, for example, the following.

For example, the matrix J (one example of the first parameter set {J}) is acquired. Or, the matrix J is determined by a calculation. The matrix J is, for example, a parameter of an Ising model. At this time, the vector h (one example of the second parameter set {h}) also may be acquired. Or, the vector h may be determined by a calculation. Two types of variables (the first variable set {x} and the second variable set {y}) are used. The update of one of the variables uses the value of the other variable. The value of the one of the variables is not used in the update of the one of the variables. After the update of the one of the variables, the other variable is updated using the value of the one of the variables after the update.

The second function recited above includes, for example, a fourth function which is a nonlinear function of the ith entry of the first variable $x_i$. The fourth function also includes an operation parameter "p." "p" changes with the update of the two types of variables.

The number of real roots of the fourth function recited above changes when "p" changes with the update of the two types of variables. The "real root of the function" is the value (the real number) of a variable for which the value of the function is zero. In the second variable update, in the case where only the fourth function is considered, the real roots of the fourth function correspond to fixed points of a nonlinear dynamic system. (In a Hamiltonian dynamic system, the fixed points correspond to extreme values of the Hamiltonian). Therefore, a change of the number of real roots of the fourth function corresponds to a change of the number of fixed points. This corresponds to bifurcation phenomena in the nonlinear dynamic system. In the algorithm used in the calculating device according to the embodiment, the initial values of the variables are set to be near one initial stable fixed point. Bifurcations are caused by changing "p." The multiple stable fixed points after the bifurcation (the values of the variables change toward the vicinity of one of the multiple stable fixed points) and the discrete variables of the combinatorial optimization to be solved are caused to correspond. Thereby, the combinatorial optimization problem is solved using the bifurcation phenomenon. For example, in the example recited above, each x value at the stable fixed points after the bifurcation is the two values of positive and negative; and the sign of each x value is associated with the Ising spins (the discrete variables of the Ising problem). Because the initial stable fixed point is the origin, the initial value of each x and the initial value of each y are set to values near the origin (that is, small random numbers having absolute values of 0.1 or less).

The fourth function is, for example, $dt*(p-D'-x_i*x_i)*x_i$. "D" is an appropriate constant satisfying $0 \leq D' \leq D$. At the initial time, p=0; and $x_i=0$ is the only root of the fourth function; but when p becomes larger than D', there are three roots; and the two roots of positive and negative are associated with the Ising spins. For example, in the case where the second function is set to $dt*((p-D-x_i*x_i)*x_i-c*h_i*a)$, the second function can be expressed as the sum of the fourth function and a linear function, e.g., $dt*(p-D'-x_i*x_i)*x_i+dt*(-(D-D')*x_i-c*h_i*a)$. Accordingly, the second function includes the fourth function.

The fourth function recited above is, for example, a cubic function. For example, the calculations are easier by such processing than by calculations using a nonlinear function (e.g., a sigmoid function) used in a neural network.

In the embodiment, the calculations become faster by increasing the time step (e.g., "dt"). On the other hand, the calculations become unstable when the time step is increased excessively. By considering this, the time step may be increased in a part of the calculations; and the time step may be reduced in another part of the calculations. For example, a large time step is applicable to the update including the product-sum operation of the matrix and the first variable x having the large calculation amount. A small time step is applicable to the other updates. Thereby, even faster speeds are possible.

Examples in the case where such a calculation is performed will now be described.

Figure 5:
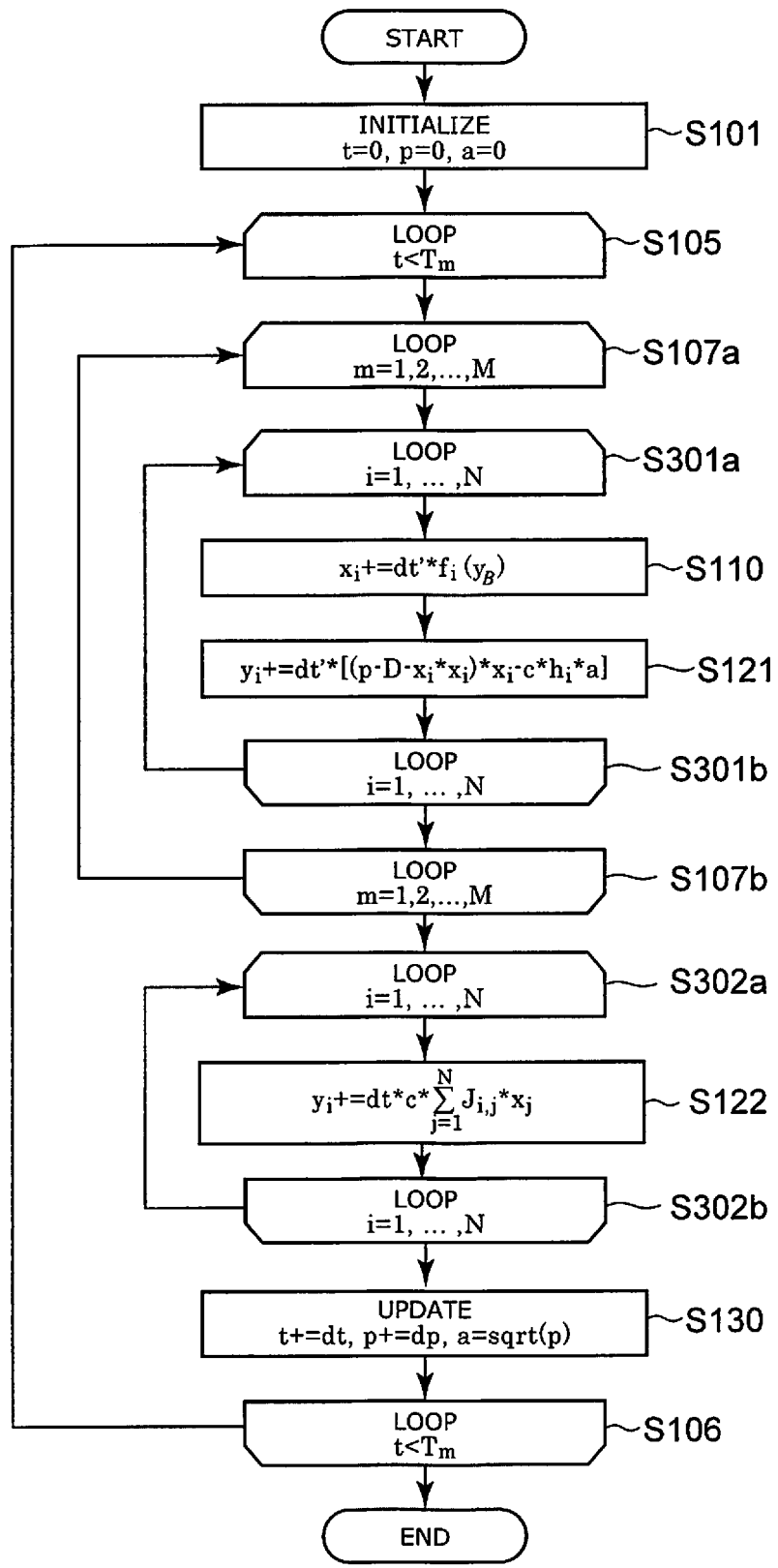
FIG. 5 is a flowchart illustrating a part of the operation of the calculating device according to the embodiment.

FIG. 5 is a flowchart illustrating a part of the operation of the calculating device according to the embodiment.

FIG. 5 illustrates step S210. In the example shown in FIG. 5, a small loop (step S107a to step S107b) is provided inside one "processing procedure" (the group of the processing between step S105 and step S106). In step S107a, the loop variable "m" is not less than 1 and not more than M. Step S110 and step S121 are repeated M times inside the small loop. The order of step S110 and step S121 is interchangeable. Subsequently, the flow proceeds to step S122.

In the example of FIG. 5, step S122 is performed after step S110 and step S121 are repeated.

Figure 6:
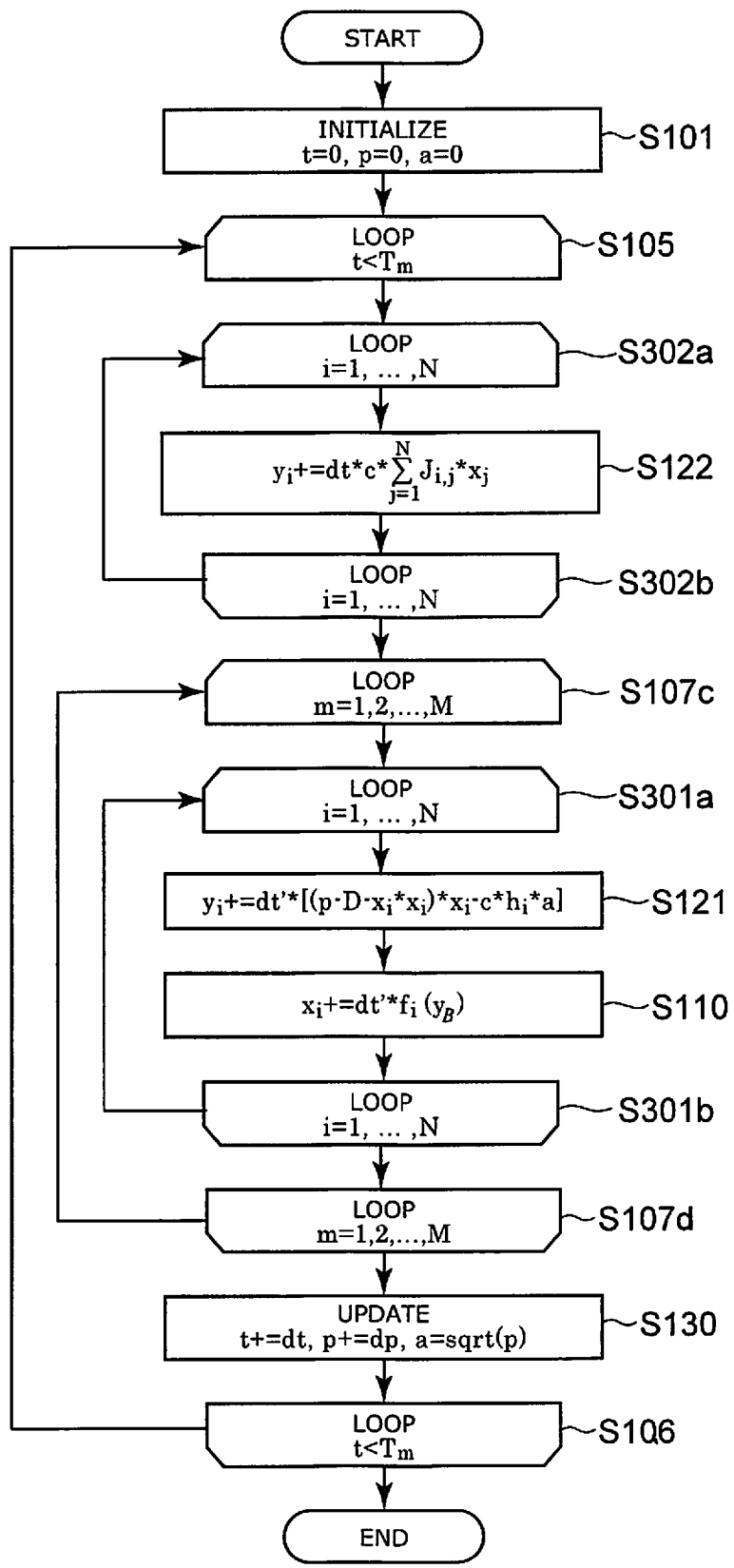
FIG. 6 is a flowchart illustrating a part of the operation of the calculating device according to the embodiment.
Figure 7:
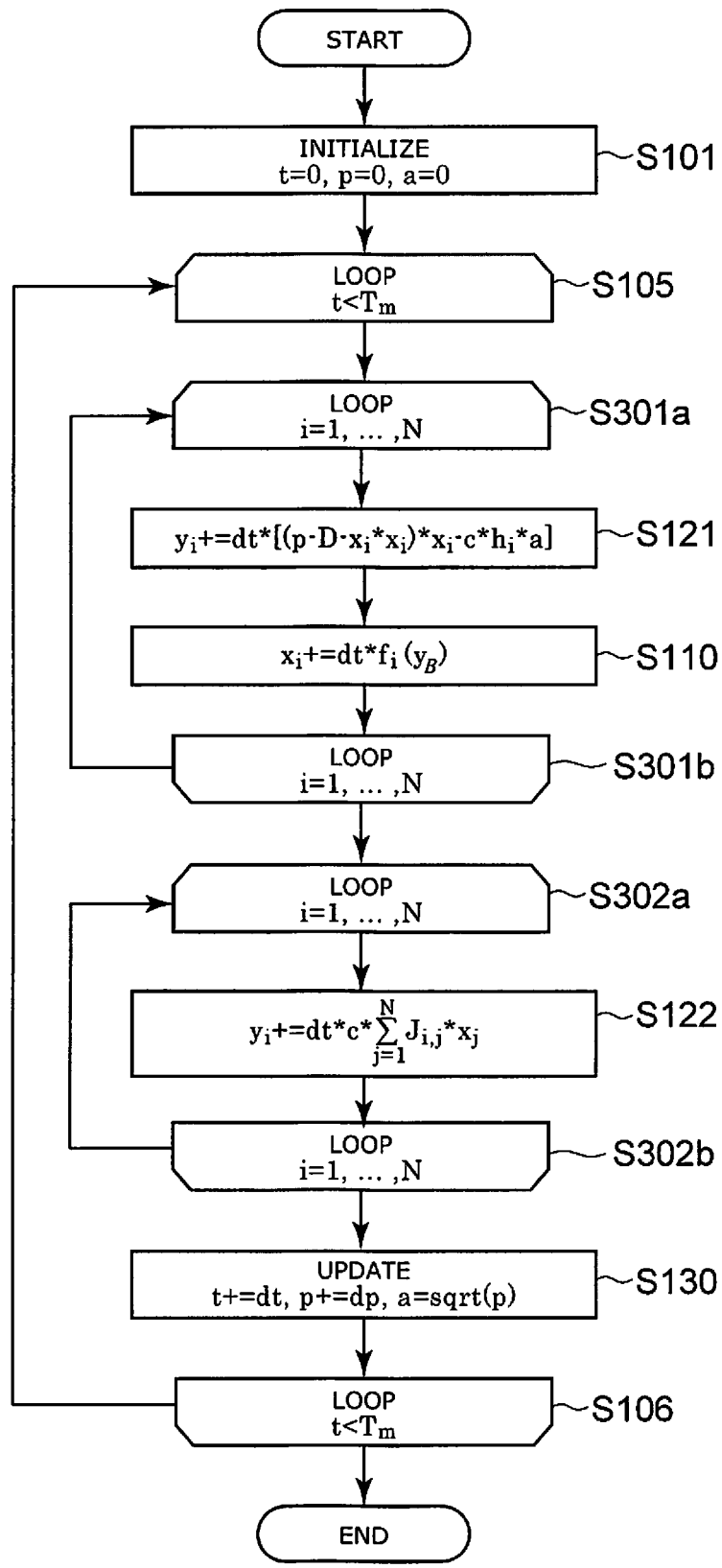
FIG. 7 is a flowchart illustrating a part of the operation of the calculating device according to the embodiment.
Figure 8:
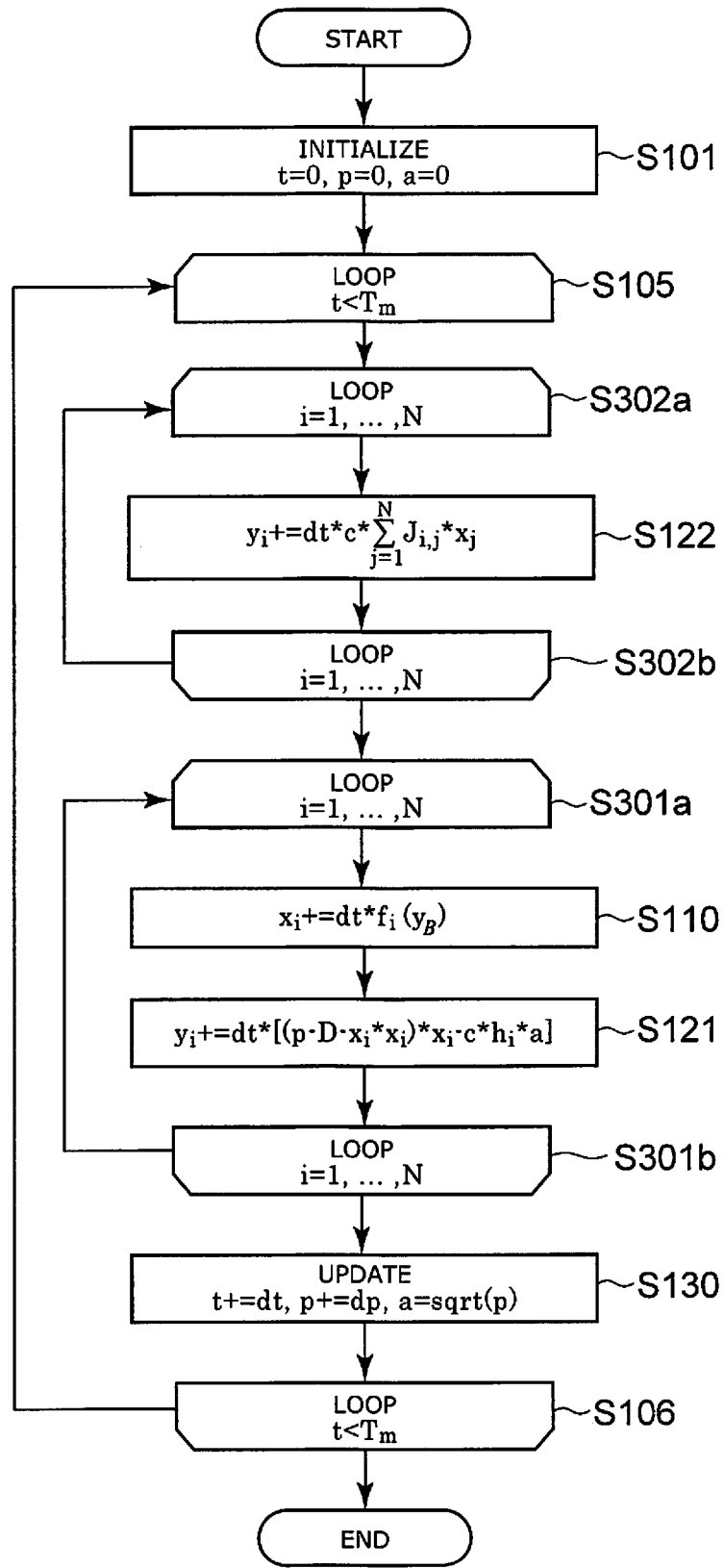
FIG. 8 is a flowchart illustrating a part of the operation of the calculating device according to the embodiment.
Figure 9:
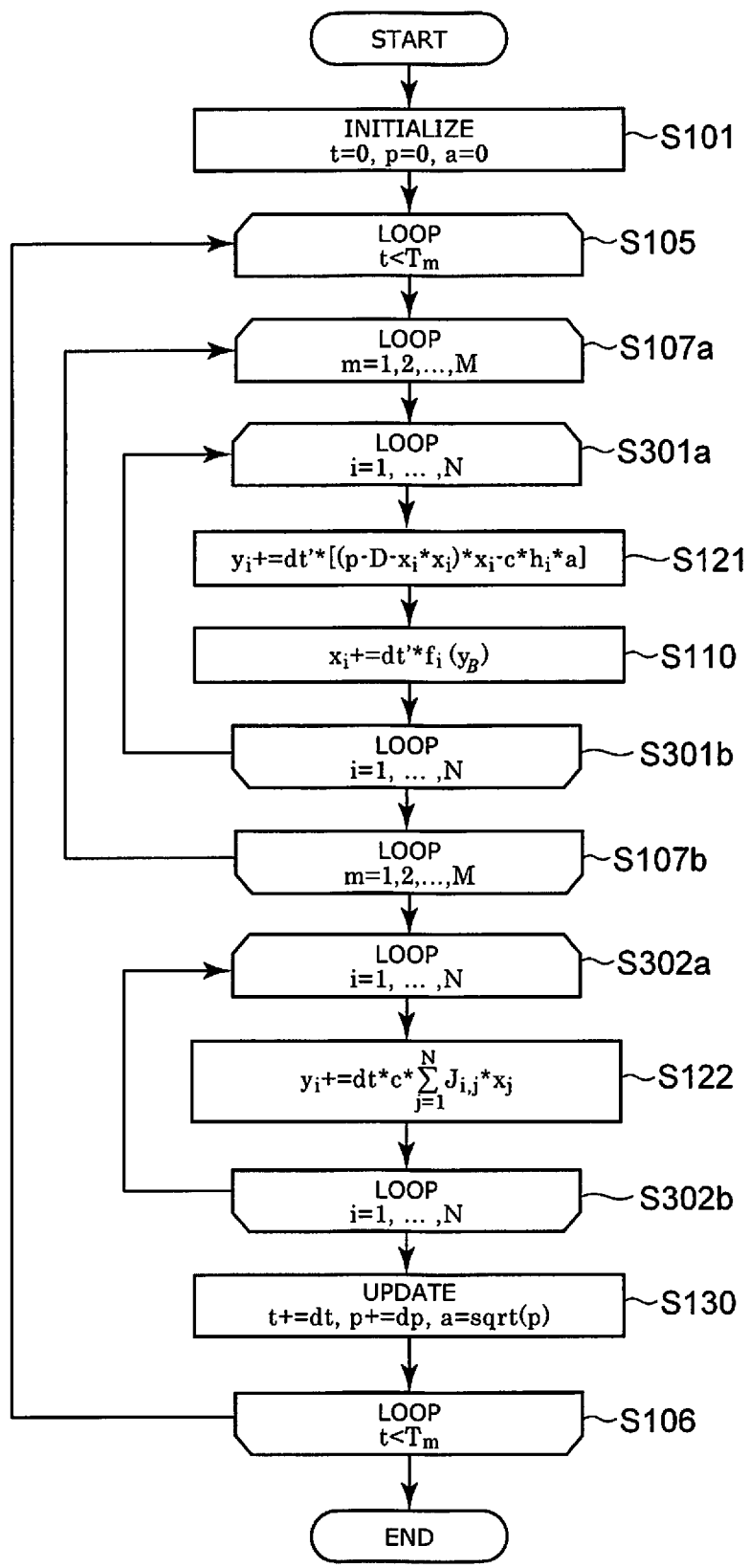
FIG. 9 is a flowchart illustrating a part of the operation of the calculating device according to the embodiment.
Figure 10:
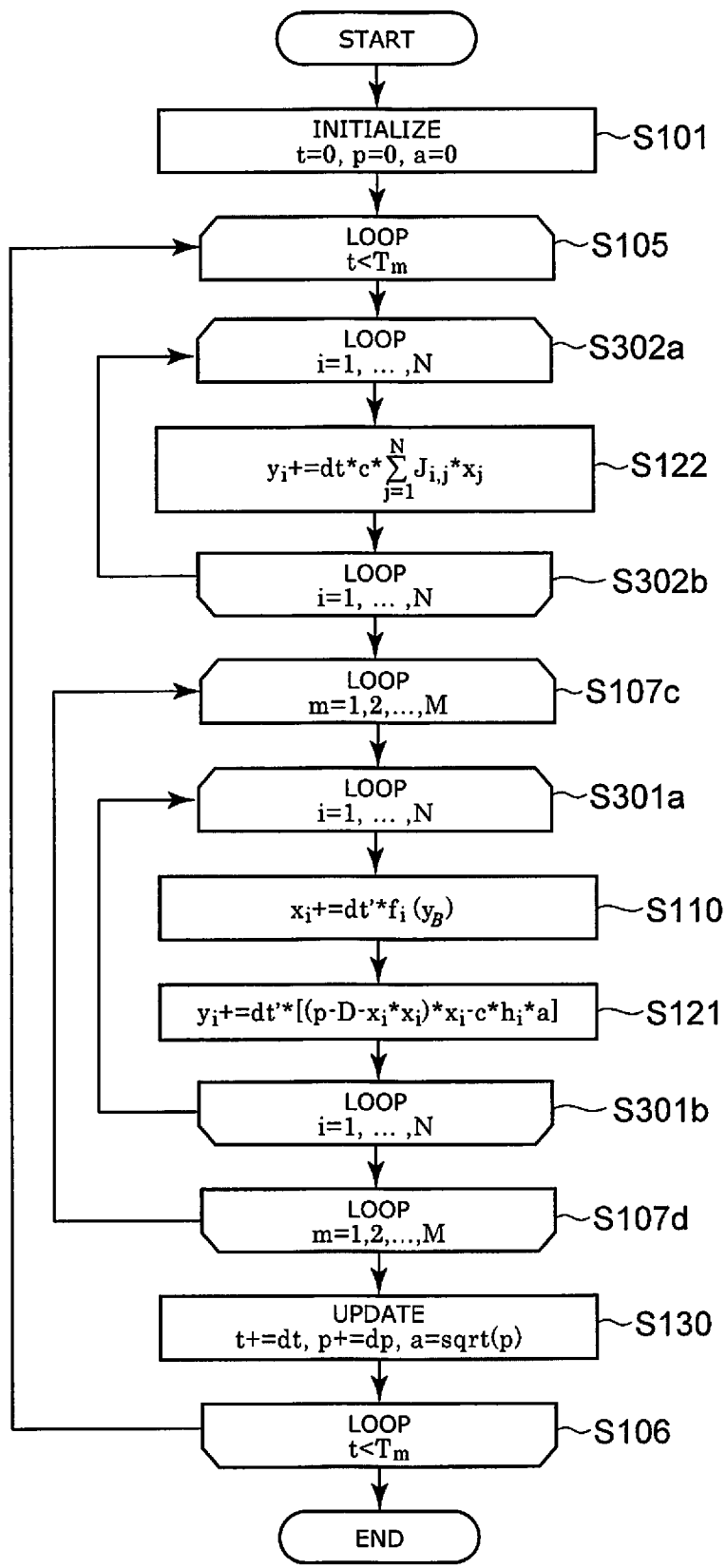
FIG. 10 is a flowchart illustrating a part of the operation of the calculating device according to the embodiment.

FIG. 6 is a flowchart illustrating a part of the operation of the calculating device according to the embodiment.

FIG. 6 illustrates step S210. In the example shown in FIG. 6 as well, a small loop (step S107c to step S107d) is provided inside one loop (step S105 to step S106). In step S107c, the loop variable "m" is not less than 1 and not more than M. The small loop (repeating step S121 and step S110) is performed after step S122 is performed. Step S121 and step S110 are repeated M times inside the small loop. The order of step S121 and step S110 is interchangeable.

In the example of FIG. 5, the update of the second variable $y_i$ is performed after the update of the first variable $x_i$. In the example of FIG. 6, the update of the first variable $x_i$ is performed after the update of the second variable $y_i$. For example, the time step "dt" of the update not including the product-sum operation relating to the matrix J is set to "dt/M." On the other hand, in one update (the large loop) including the product-sum operation relating to the matrix J, the small loop (the update not including the product-sum operation relating to the matrix J) is performed M times. By the flow recited above, for example, the time step dt of the large loop can be set to a relatively large value. For example, a high-speed calculation is possible.

Thus, in one example of the embodiment, the second variable update (step S120) recited above includes the first sub-update (step S121) and the second sub-update (step S122).

The first sub-update (step S121) includes updating the ith entry of the second variable $y_i$ by adding the second function to the ith entry of the second variable $y_i$ before the first sub-update. The second sub-update (step S122) includes updating the ith entry of the second variable $y_i$ by adding the third function to the ith entry of the second variable $y_i$ before the second sub-update. Even in such a case, the second function is independent of the second variable set {y}. The third function is independent of the second variable set {y}.

For example, the second sub-update is performed after the first variable update and the first sub-update are performed alternately M times (M being an integer of 2 or more). Or, the first variable update and the first sub-update are performed alternately M times after the second sub-update. The order of performing the first variable update and the first sub-update alternately is interchangeable.

The third function includes, for example, the product-sum operation of at least a part of the first parameter set {J} recited above and at least a part of the first variable set {x} recited above.

In one example, the number of real roots of the fourth function after repeating the processing procedure recited above is 2 or more. One of the roots of the fourth function after repeating the processing procedure is positive. Another one of the roots of the fourth function after repeating the processing procedure is negative. For example, the processor 20 (referring to FIG. 1) outputs the sign (i.e., ±1) of the ith entry of the first variable $x_i$ obtained after repeating the processing procedure.

As described above, the second function may include an ith entry of a second parameter $h_i$. The ith entry of the second parameter $h_i$ is one of the second parameter set {h}.

In the embodiment, the processor 20 reads the data stored in the storer 10, updates the data, and stores the updated data in the storer 10.

For example, the first variable update (step S110) includes acquiring, from the storer 10, the ith entry of the first variable $x_i$ before the first variable update, and storing, in the storer 10, the ith entry of the first variable $x_i$ after the first variable update. The second variable update (step S120) includes acquiring, from the storer 10, the ith entry of the second variable $y_i$ before the second variable update, and storing, in the storer 10, the ith entry of the second variable $y_i$ after the second variable update.

For example, the first variable update may further include acquiring the ith entry of the second variable $y_i$ from the storer 10, calculating the ith entry of the first function, and updating the ith entry of the first variable $x_i$ by adding the ith entry of the first function to the ith entry of the first variable $x_i$. For example, the second variable update may further include acquiring the ith entry of the first variable $x_i$ from the storer 10, calculating the second function, acquiring at least a part of the first parameter set {J} recited above and at least a part of the first variable set {x} recited above from the storer 10, calculating the third function, and updating the ith entry of the second variable $y_i$ by adding the second function and the third function to the ith entry of the second variable $y_i$.

In the embodiment, for example, in the case where the matrix J is a sparse matrix, a sparse matrix compression format may be used. For example, the COO (coordinate) format, the CSR (compressed sparse row) format, or the like is applicable to the sparse matrix compression format. For example, the memory size can be conserved by using the sparse matrix compression format. For example, the product-sum operation of the matrix J and the first variable x can be performed quickly by using the sparse matrix compression format.

Examples of the constant "c" will now be described. For example, the detuning "D" is set to be larger than c times a maximum eigenvalue λmax of the matrix J. In the case where "D" is too large, unnecessary calculation time occurs. Therefore, for example, "D" is set to be substantially equal to c times λmax. In such a case, c=D/λmax. On the other hand, in one example, the matrix J is a real symmetric matrix. In such a case, λmax is substantially the same as $2\sigma \times N^{1/2}$ when the size of the matrix J is sufficiently large. This relationship is based on the Wigner semicircle distribution of a random matrix. "σ" is the standard deviation of the nondiagonal entries of the matrix J. In such a case, it is sufficient to set $c=D/(2\sigma \times N^{1/2})$. Calculation examples in such a case are described below.

In the second calculation method (the second calculating device), for example, the first calculation parameter R(t) corresponds to the detuning. For example, the second calculation parameter R(t) corresponds to the reciprocal of the mass.

In the third calculation method (the third calculating device), for example, the second calculation parameter T(t)

is a temperature. For example, the third calculation parameter G(t) corresponds to the reciprocal of the virtual mass.

In the second calculation method and the third calculation method, the mean square of the initial value of the second variable y may be set to increase. For example, the mean square of the initial value of the second variable set {y} may be set to be greater than 0.1 times the mean square of the final value of the first variable set {x}. A wide range of solutions can be searched for by using a wide range of second variables y (e.g., momentums).

For example, the initial value of the second calculation parameter T(t) is set to be substantially the same as the mean square of the first to Nth second variables $y_1$ to $y_N$. For example, the absolute value of the difference between the initial value of the second calculation parameter T(t) and the mean square of the first to Nth second variables $y_1$ to $y_N$ is less than 0.5 times the mean square of the first to Nth second variables $y_1$ to $y_N$.

As a method for increasing the accuracy in the embodiment, it is considered that the function used as the nonlinear function recited above can be modified. For example, in the first to third calculation methods (first to third calculating devices), the functions described in reference to the ninth formula to fifteenth formulas recited above can be used appropriately. Further, the following sixteenth formula may be used instead of the eighth formula $$\frac{dy_i}{dt} = \{[-D + p(i)](1 + x_i^n) - Kx_i^{n+2}\}x_i - ch_i a(t) + c\sum_{j=1}^{N} J_{i,j} x_j \quad (16)$$

In the sixteenth formula, "n" is an even number of 2 or more. By using such a function, for example, the accuracy of the solution of the Ising problem can be increased.

The algorithm recited above that is performed by the calculating device 110 according to the embodiment can be performed using various configurations. The calculating device 110 may include, for example, a PC cluster. The calculating device 110 may include, for example, a GPU (Graphics Processing Unit). The calculating device 110 may include, for example, a dedicated circuit. The dedicated circuit may include, for example, at least one of a FPGA (field-programmable gate array), a gate array, or an ASIC (application specific integrated circuit). The calculating device 110 may include, for example, a parallel digital calculating device.

FIG. 7 to FIG. 10 are flowcharts illustrating a part of the operation of the calculating device according to the embodiment.

These figures show other examples of step S210. As shown in these figures, step S110 and step S121 of the examples of FIG. 3 to FIG. 6 may be interchanged with each other.

Figure 11:
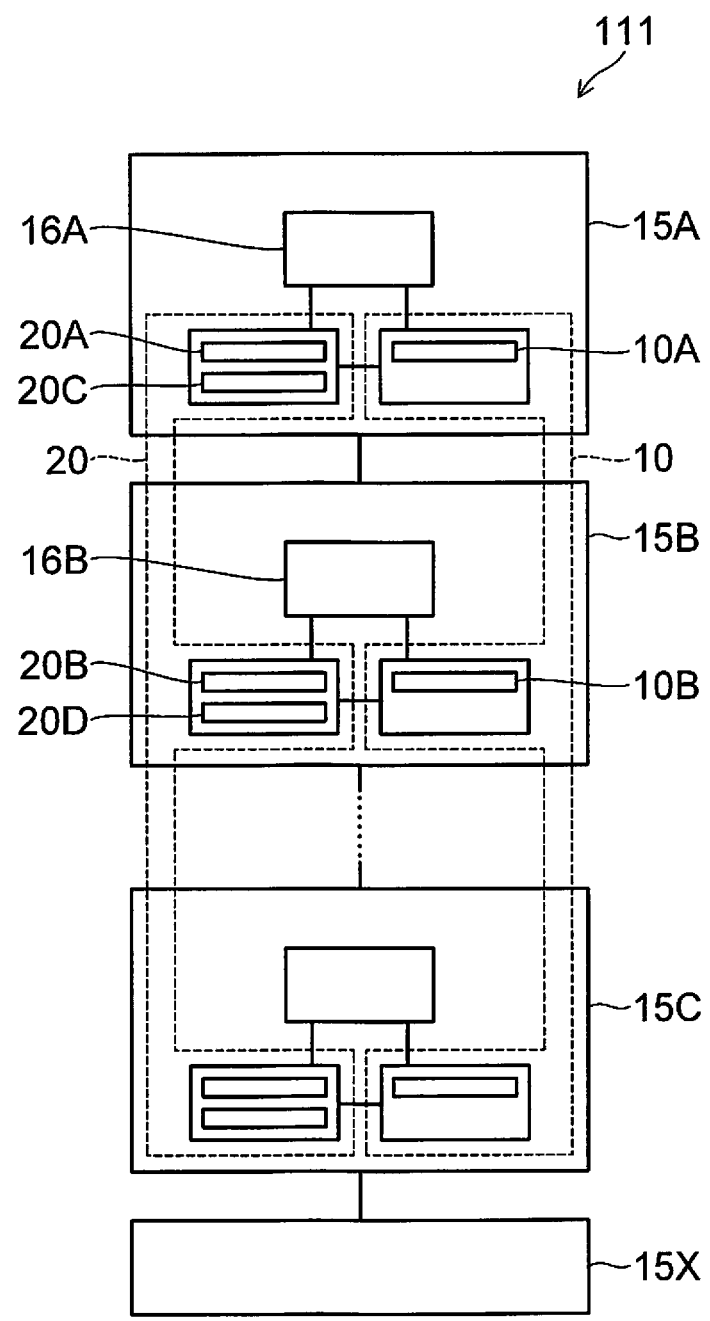
FIG. 11 is a schematic view showing an example of a calculating device according to the embodiment.

FIG. 11 is a schematic view showing an example of a calculating device according to the embodiment.

As shown in FIG. 11, the calculating device 111 according to the embodiment includes multiple circuits (a first circuit 15A, a second circuit 15B, a third circuit 15C, etc.). Each of these multiple circuits is, for example, one computer. Each of these multiple circuits may be, for example, one semiconductor circuit.

These multiple circuits can communicate (e.g., transmit and receive data) with one another. A control circuit part 15X is further provided in the calculating device 111. The communication of the multiple circuits is controlled by the control circuit part 15X.

For example, a processor and a storer (memory) are provided in each of the multiple circuits. A controller also may be provided.

Parallel computations are performed by the multiple circuits (the first circuit 15A, the second circuit 15B, the third circuit 15C, etc.). The number of the multiple circuits is arbitrary.

For example, a first calculator 20A and a first storage region 10A are provided in the first circuit 15A. In the example, the first circuit 15A further includes a first controller 16A. A second calculator 20B and a second storage region 10B are provided in the second circuit 15B. In the example, the second circuit 15B further includes a second controller 16B. Such a configuration is provided also in the third circuit 15C.

The processor 20 includes the multiple calculators (the first calculator 20A, the second calculator 20B, etc.) recited above. For example, the first calculator 20A performs a part of the calculation of the third function (e.g., a part of the loop over i of step S302a, step S122, and step S302b). The second calculator 20B performs another part of the calculation of the third function (e.g., another part of the loop over i of step S302a, step S122, and step S302b). At least a part of these calculations is performed in parallel. For example, at least a part of performing the part of the calculation of the third function recited above in the first calculator 20A and at least a part of performing the other part of the calculation of the third function in the second calculator 20B are performed simultaneously. The speed of the calculations can be increased by the parallel computation. The calculation amount of the third function is high. Therefore, higher speeds are realized effectively by parallelization of the calculation of the third function (e.g., the loop over i of step S302a, step S122, and step S302b).

In the parallel computation, for example, the first calculator 20A stores, in the first storage region 10A, a part of the first parameter set {J} that is necessary for performing the part of the calculation of the third function. Thus, the processing and storing necessary for the part of the calculation of the third function are performed inside the first circuit 15A. On the other hand, the second calculator 20B stores, in the second storage region 10B, another part of the first parameter set {J} that is necessary for performing the other part of the calculation of the third function. Thus, the processing and storing necessary for the other part of the calculation of the third function are performed inside the second circuit 15B.

For example, the first parameter set {J} includes a first-calculation-used part and a second-calculation-used part. The first-calculation-used part is used in the part of the calculation of the third function. The second-calculation-used part is used in the other part of the calculation of the third function. The first calculator 20A stores the first-calculation-used part recited above in the first storage region 10A. The second calculator 20B stores the second-calculation-used part recited above in the second storage region 10B.

In the embodiment, the first variable update of the ith entry of the first variable $x_i$ and the first sub-update (the update using the second function) of the ith entry of the second variable $y_i$ may be a parallel computation with the first variable update of a jth entry of the first variable $x_j$ ("j" being different from "i") and the first sub-update (the update using the second function) of a jth entry of the second variable $y_j$. In such a case, a third calculator 20C and a fourth calculator 20D may be provided in the processor 20. The third calculator 20C is provided in the first circuit 15A. The fourth calculator 20D is provided in the second circuit 15B. These calculators are functional blocks. The processing that is performed by at least a part of the third calculator 20C may be performed by at least a part of the first calculator 20A. The processing that is performed by at least a part of the fourth calculator 20D may be performed by at least a part of the second calculator 20B.

For example, the third calculator 20C performs a part of the calculation of the first variable update and a part of the calculation (the first sub-update) of the second function. The fourth calculator 20D performs another part of the calculation of the first variable update and another part of the calculation (the first sub-update) of the second function.

As described above, the first variable update includes updating the ith entry of the first variable $x_i$ by adding the ith entry of the first function to the ith entry of the first variable $x_i$ before the first variable update. Similarly, the first variable update further includes updating the jth entry of the first variable $x_j$ by adding a jth entry of the first function to the jth entry of the first variable $x_j$ before the first variable update U being different from i, and being an integer not less than 1 and not more than N). Her e, the jth entry of the first variable $x_j$ is one of the first variable set $\{x\}$. The variable of the jth entry of the first function includes the jth entry of the second variable $y_j$. The jth entry of the second variable $y_j$ is one of the second variable set $\{y\}$.

For example, a part of the calculation of the first variable update includes the calculation of the update of the ith entry of the first variable $x_i$. Another part of the calculation of the first variable update includes the calculation of the update of the jth entry of the first variable $x_j$.

On the other hand, a part of the calculation of the second function includes the calculation of the second function having the ith entry of the first variable $x_i$ as a variable. Another part of the calculation of the second function includes the calculation of the second function having the jth entry of the first variable $x_j$ as a variable.

At least a part of performing a part of the calculation of the first variable update and a part of the calculation (the first sub-update) of the second function (e.g., a part of the i loop between step S301a and step S301b in the flowchart of FIGS. 3 to 10) in the third calculator 20C and at least a part of performing another part of the calculation of the first variable update (e.g., another part of the i loop between step S301a and step S301b in the flowchart of FIGS. 3 to 10) and another part of the calculation (the first sub-update) of the second function in the fourth calculator 20D may be performed simultaneously. The calculations can be fast by using such a parallel computation.

In the third calculation method (the third calculating device), the mean square of the thirteenth formula is used as the mean square of the second variable y corresponding to the first variable x updated in the "part of the calculation of the first variable update" recited above. Thereby, for example, in the "parallel computation," communication of the second variable y is unnecessary between the "other part of the calculation of the first variable update" and the "part of the calculation of the first variable update" for calculating the mean square. Higher speeds are easier due to the parallel computation. The partial set "$S_i$" is defined so that parallel computation is possible.

For example, one part of the processor 20 performs the update of a part of the second variable set $\{y\}$ and the calculation of the mean square relating to the part of the second variable set $\{y\}$. In such a case, the part of the second variable set $\{y\}$ recited above corresponds to one of the multiple subsets recited above (e.g., "$S_i$"). Another one part of the processor 20 performs the update of another part of the second variable set $\{y\}$ and the calculation of the mean square relating to the other part of the second variable set $\{y\}$. In such a case, the other part of the second variable set $\{y\}$ recited above corresponds to another one of the multiple subsets recited above (e.g., "$S_k$"). For example, the mean square that is calculated by the one part of the processor 20 recited above is used to update the part of the second variable set $\{y\}$ recited above. For example, the mean square that is calculated by the other one part of the processor 20 recited above is used to update the other part of the second variable set $\{y\}$ recited above.

Because the update of a part of the second variable set $\{y\}$ and the calculation of the mean square of the part are performed by a part of the processor 20, the communication (the transfer of data) is efficient. Or, the communication is unnecessary.

For example, at least a part of performing the update of the part of the second variable set $\{y\}$ recited above and the calculation of the mean square relating to the part of the second variable set $\{y\}$ recited above and at least a part of performing the update of the other part of the second variable set $\{y\}$ recited above and the calculation of the mean square relating to the other part of the second variable set $\{y\}$ recited above are performed simultaneously. The processing time can be shortened by the parallel calculation.

Calculation examples of the calculating device according to the embodiment will now be described. In the following calculation examples, the calculation time does not include the time of setting the parameters. The calculation time corresponds to the time necessary to solve the differential equation after setting the parameters.

In a first calculation example, the calculations are performed by a PC cluster. In the first calculation example, the variables and the parameters are treated as "float" (32-bit floating-point numbers). The number of computing cores is taken as "Q." "Q" is the divisor of N. It is taken that L=N/Q.

A MPI (Message Passing Interface) is used when calculating the algorithm recited above in parallel using the PC cluster. The MPI corresponds to distributed-memory parallel computing. In the MPI, each of the multiple computing cores processes one combination of L first split variables (x) and L second split variables (y).

For example, the ith computing core stores and performs the updates of $\{x_n|n=(i-1)L+1, \ldots, iL\}$ and $\{y_n|n=(i-1)L+1, \ldots, iL\}$.

The ith computing core also can store $\{h_n|n=(i-1)L+1, \ldots, iL\}$ and $\{J_{m,n}|m=(i-1)L+1, \ldots, iL; n=1, \ldots, N\}$. The update of $\{y_n|n=(i-1)L+1, \ldots, iL\}$ uses $\{h_n|n=(i-1)L+1, \ldots, iL\}$ and $\{J_{m,n}|m=(i-1)L+1, \ldots, iL; n=1, \ldots, N\}$.

For example, all entries of $\{x_n|n=1, \ldots, N\}$ are used in the update of each of $\{y_n|n=(i-1)L+1, \ldots, iL\}$. For example, the information of $\{x_n|n=1, \ldots, N\}$ is supplied to all of the computing cores by an Allgather function. In other words, the information (the data) is shared.

In the embodiment, communication is performed between the multiple computing cores. In other words, the transmission and reception of the data is performed. The communication relating to $\{y_n|n=(i-1)L+1, \ldots, iL\}$ and the communication relating to $\{J_{m,n}|m=(i-1)L+1, \ldots, iL; n=1, \ldots, N\}$ are unnecessary.

In the third calculation method (the third calculating device), the ith computing core uses the mean square of $\{y_n|n=(i-1)L+1, \ldots, iL\}$ as the mean square of the second variable y of the thirteenth formula that is necessary for the update of $\{x_n | n=(i-1)L+1, \ldots, iL\}$. Thereby, the communication of the second variable y between the cores for calculating the mean square of the second variable y is unnecessary.

For example, a method may be considered in which the product-sum operation of the first parameter set $\{J\}$ and the first variable set $\{x\}$ is split and performed in parallel without performing the communication relating to the first variable set $\{x\}$; the results are communicated; and the update of the second variable set $\{y\}$ is performed. In this method, the product-sum operation of the first parameter set $\{J\}$ and the first variable set $\{x\}$ is split and performed.

Examples of calculations in the case where N=2000 (the first calculation example) and the case of N=100000 (a second calculation example) will now be described.

As the first calculation example (the case of N=2000), the calculation example of a "$K_{2000}$" problem will be described. The "$K_{2000}$" problem is a fully-connected Ising model in which N=2000. The nondiagonal entries of the matrix J are one of ±1. The entries of the vector h all are zero. Accordingly, the calculations of the terms including the vector h are not performed. In such a case, the standard deviation a of the nondiagonal entries of the matrix J is 1. Therefore, "c" is set to $c_0=D/(2N^{1/2})$. The actual maximum eigenvalue of the matrix J in the "$K_{2000}$" problem is 88.813324. On the other hand, the theoretical value of random matrix theory is $2\sigma N^{1/2}=89.442719$; and these values are extremely near each other.

In the first calculation example described below, Q=25; $dp*(T_m/dt)=D=2$; and $T_m=50$.

In the first calculation method according to the embodiment (the first calculating device and the tenth formula), in the case where M=1 and dt=0.25, the calculation time is 7.6 ms. The average value of the Ising energy obtained at this time for 100 times is about −66086. This value is 32523 when converted into the "cut number" (referring to the seventeenth formula and the eighteenth formula. A large "cut number" corresponds to a high accuracy. The cut number Nmc is represented by the following seventeenth and eighteenth formulas.

$$Nmc = \frac{Nmc0 - E_{Ising}}{2} \quad (17)$$

$$Nmc0 = -\frac{1}{2}\sum_{i=1}^{N}\sum_{j=1}^{N} J_{i,j} \quad (18)$$

In the first calculation method according to the embodiment (the first calculating device and the tenth formula), in the case where M=5 and dt=0.5, the calculation time is 4.1 ms. The average value of the Ising energy obtained at this time for 100 times is about −66137. This value is 32549 when converted into the "cut number." In the case of M=5, "dt" can be 2 times "dt" of the case of the M=1. In the case of M=5, the calculation time is about half of the calculation time of the case of the M=1. High-speed calculations are possible.

On the other hand, the average value of the "cut number" for 100 times at 5 ms in a coherent Ising machine is 32457. On the other hand, the average value of the "cut number" for 100 times at 50 ms in simulated annealing is 32314. Thus, by the calculation according to the embodiment, a solution that has higher accuracy is obtained in a short period of time than in a coherent Ising machine or in simulated annealing.

Figure 12:
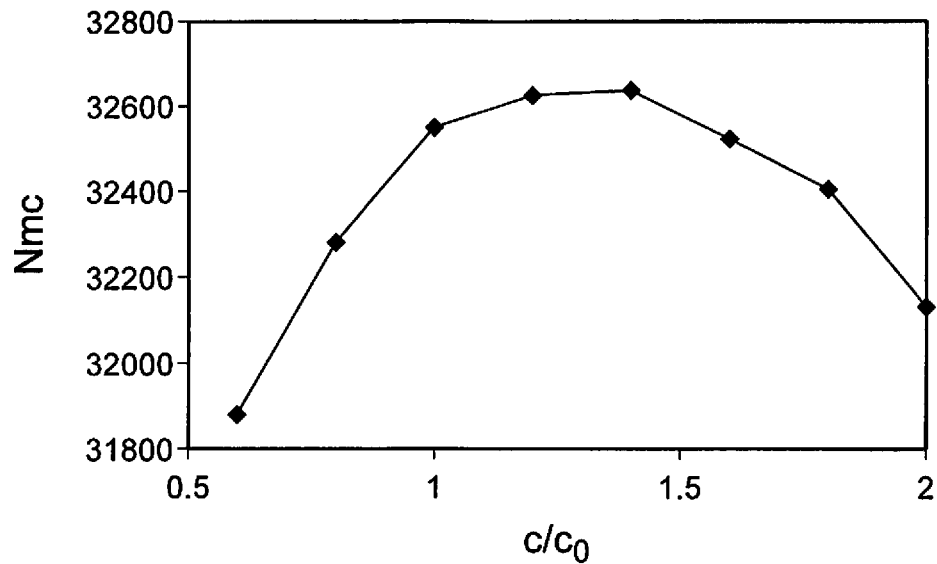
FIG. 12 is a graph illustrating a characteristic of the calculation according to the embodiment.

FIG. 12 is a graph illustrating a characteristic of the calculation according to the embodiment.

FIG. 12 shows an example of the relationship between "c" and the "cut number" obtained by the calculation. The vertical axis of FIG. 12 is "$c/c_0$." As described above, $c_0=D/(2N^{1/2})$. The vertical axis of FIG. 12 is the cut number Nmc.

As shown in FIG. 12, a large cut number Nmc is obtained when "$c/c_0$" is not less than about 1 and not more than about 1.5.

The second calculation example (the case of N=100000) will now be described. In the second calculation example, the nondiagonal entries of the matrix J and the entries of the vector h are set using "random numbers." As the "random numbers," values of −1 to 1 are set uniformly. The standard deviation a of the nondiagonal entries of the matrix J in such a case is $1/(3^{1/2})$. Therefore, c is set to $c=3^{1/2}D/(2N^{1/2})$. For the other parameters, Q=1250; $dp*(T_m/dt)=D=2$; $T_m=50$; dt=0.5; and M=5.

Figure 13:
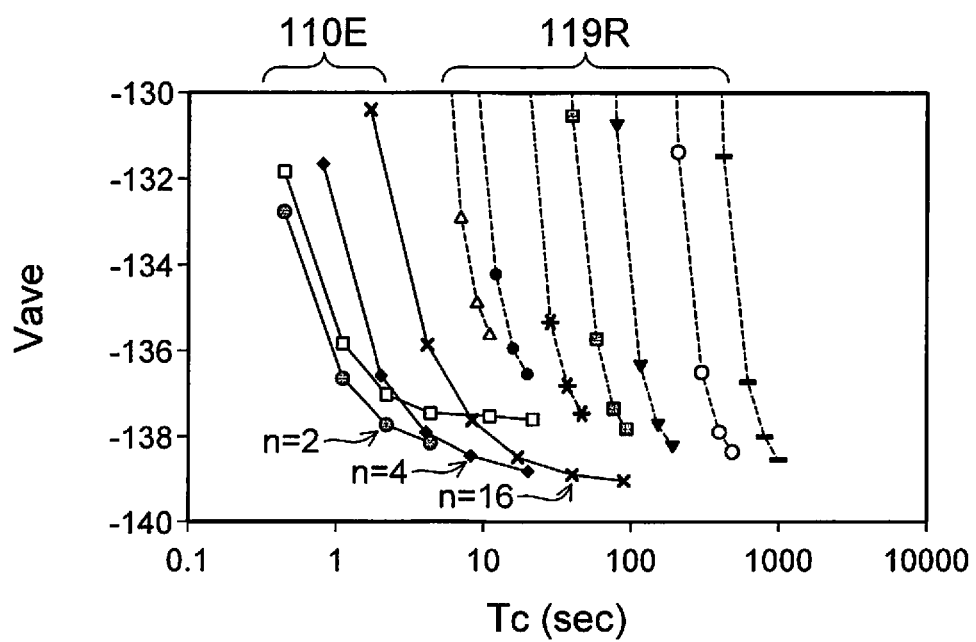
FIG. 13 is a graph illustrating the calculation results.

FIG. 13 is a graph illustrating the calculation results.

FIG. 13 shows the results of the second calculation example for the first calculation method according to the embodiment (the first calculating device and the tenth formula) and the results of the second calculation example for a calculation according to a reference example. The horizontal axis of FIG. 13 is a calculation time Tc (seconds). The vertical axis is an average value Vave of the Ising energy for 100 times. A calculation result 110E according to the embodiment and a calculation result 119R of the reference example are shown in FIG. 13. The number of computing cores is 1250 in these calculation examples.

For the calculation result 110E of the first calculation method according to the embodiment (the first calculating device and the tenth formula), "n" is the value of "n" in the sixteenth formula in the case where the nonlinear function of the sixteenth formula is used. For the calculation result 110E, the curve for which "n" is not notated corresponds to the case where the eighth formula is used.

A calculation using simulated annealing is performed for the calculation result 119R of the reference example. In the simulated annealing, parallel computation of the energy change due to spin reversal is performed using an MPI. In these calculations, the inverse temperature is increased linearly. The increase rates are different between the multiple curves of the calculation result 119R of the reference example.

It can be seen from FIG. 13 that the final average value Vave is low (the absolute value is large) for the calculation result 110E of the first calculation method according to the embodiment (the first calculating device and the tenth formula). Conversely, in the calculation results of the reference example, the final average value Vave is insufficiently low (the absolute value is insufficiently large). Thus, a calculation result that has high accuracy is obtained in the embodiment. According to the embodiment, compared to the reference example (the simulated annealing), the calculation time Tc necessary to obtain the same accuracy is 1/10 or less. Compared to the reference example, the calculation according to the embodiment is at least 10 times faster.

A third calculation example of the calculation according to the embodiment will now be described. In the third calculation example, the calculation recited above is performed using a GPU. In the calculation, for example, the variables and the parameters are treated as floating (32-bit floating-point numbers).

In this method, the first variable set $\{x\}$, the second variable set $\{y\}$, the first parameter set $\{J\}$, and the second parameter set {h} are defined as the device variables. The first parameter set {J} is the matrix J. The update of the second variable y using the product-sum operation of the matrix J and the first variable x is performed using a matrix-vector product function. For the other updates relating to the first variable x and the second variable y, the updates of the ith entries ($x_i$ and $y_i$) are performed in one thread.

In the third calculation example, the "$K_{2000}$" problem is calculated using one GPU and using conditions similar to those of the first calculation example. The calculation time of the third calculation example is 14.7 ms; and the average value of the "cut number" for 100 times is 32549. In the third calculation example as well, the calculation can be faster than the result of the simulated annealing of the reference example.

An example of the first to third calculation methods (the first to third calculating devices) will now be described.

Figure 14A:
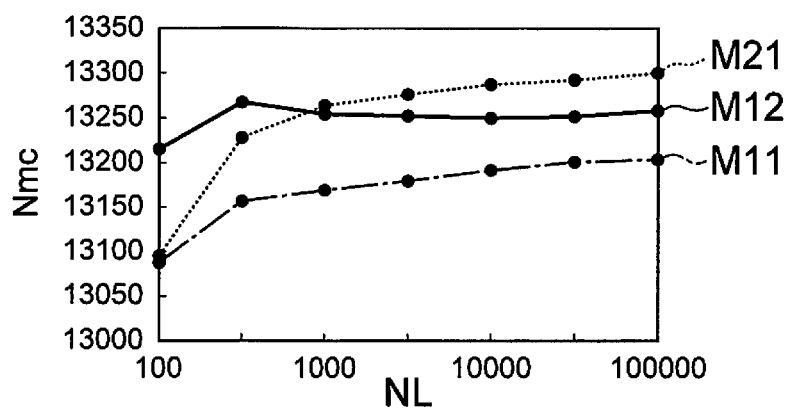
FIG. 14A and FIG. 14B are graphs illustrating the calculation results.
Figure 14B:
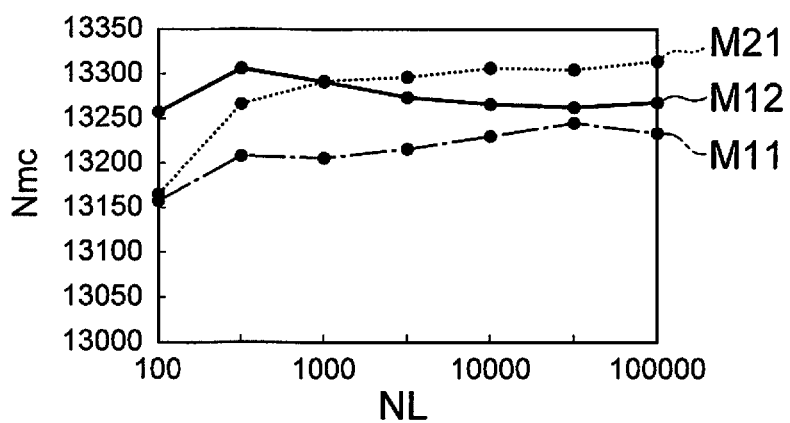

FIG. 14A and FIG. 14B are graphs illustrating the calculation results.

These figures show examples of the calculation results of a "$G_{22}$" problem. In these figures, calculation results M11 and M12 of the first calculation method (the first calculating device and the tenth formula) and a calculation result M21 of the second calculation method (the second calculating device and the twelfth formula) are shown. In the calculation result M11, the initial value MO) of the second variable y has values of random numbers in the range not less than –0.5 and not more than 0.5. In the calculation result M12, the initial value $y_i(0)$ of the second variable y has values of random numbers in the range not less than –0.1 and not more than 0.1. In the calculation result M21, the initial value $y_i(0)$ of the second variable y has values of random numbers in the range not less than –0.5 and not more than 0.5. In the second calculation method (the second calculating device and the twelfth formula), the first calculation parameter R(t) decreases monotonously from 1 toward 0 every processing procedure (loop). The calculations are performed 100 times while changing the values of the random numbers.

FIG. 14A is the average value of 100 calculations. FIG. 14B is the maximum value of 100 calculations. In these figures, the horizontal axis is a number of repetitions NL of the processing procedure. The vertical axis is the cut number Nmc. In one loop, all of the N first variables x and the N second variables y are updated.

As shown in FIG. 14A and FIG. 14B, when the number of repetitions NL of the processing procedure is 1000 or more, the cut number Nmc of the second calculation method (the second calculating device and the twelfth formula) is larger than the cut number Nmc of the first calculation method (the first calculating device and the tenth formula). For example, it is considered that the second calculation method (the second calculating device) is advantageous in the case where a relatively long period of time can be spent searching for the solution.

For example, the first calculation parameter R(t) that is included in the ith entry of the first function of the second calculation method (the second calculating device) corresponds to the inverse mass. According to the second calculation method (the second calculating device), for example, convergence to a good solution is obtained even for large initial momenta (the initial value $y_i(0)$ of the second variable y). It is easier to search in a wider range by using large initial momenta.

Figure 15A:
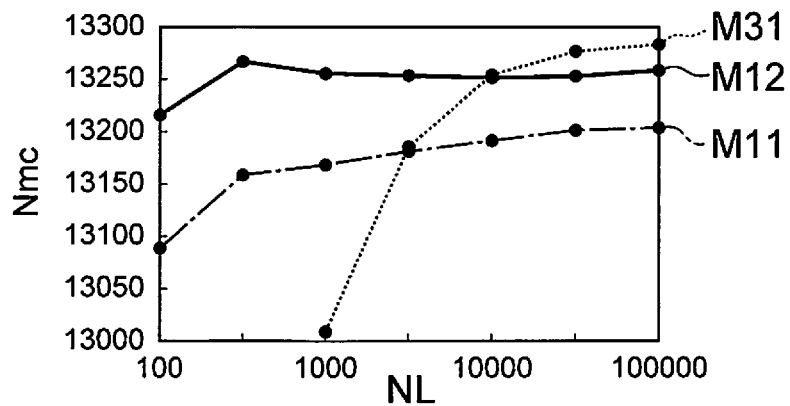
FIG. 15A and FIG. 15B are graphs illustrating calculation results.
Figure 15B:
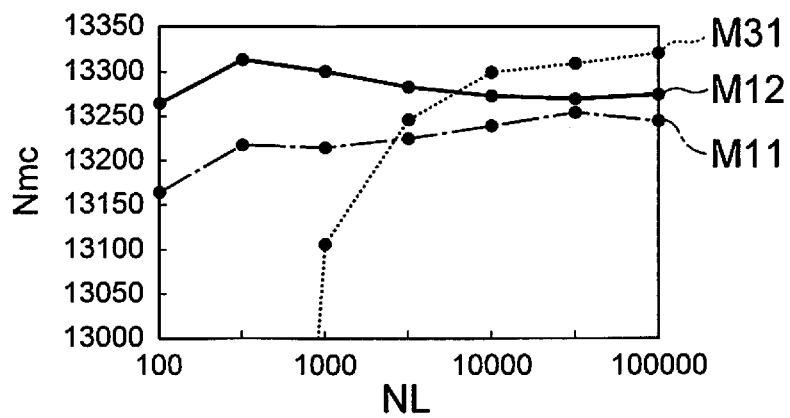

FIG. 15A and FIG. 15B are graphs illustrating calculation results.

These figures show examples of calculation results for the "$G_{22}$" problem recited above. The calculation results M11 and M12 of the first calculation method recited above and a calculation result M31 of the third calculation method (the third calculating device and the fifteenth formula) are shown in these figures. The calculation results M11 and M12 are the same as those illustrated in FIG. 14A and FIG. 14B. FIG. 15A is the average value of 100 calculations. FIG. 15B is the maximum value of 100 calculations. In these figures, the horizontal axis is the number of repetitions NL of the processing procedure. The vertical axis is the cut number Nmc.

As shown in FIG. 15A and FIG. 15B, the number of repetitions NL of the processing procedure is less than 2000; and the cut number Nmc of the third calculation method (the third calculating device and the fifteenth formula) is small. When the number of repetitions NL of the processing procedure is 2000 or more, the cut number Nmc of the third calculation method (the third calculating device and the fifteenth formula) is larger than the cut number Nmc of the first calculation method (the first calculating device and the tenth formula). For example, it is considered that the third calculation method (the third calculating device) is advantageous in the case where a relatively long period of time can be spent searching for the solution.

The ith entry of the first function of the third calculation method (the third calculating device) has the effect of causing the mean square of the ith entry of the second variable $y_i$ to approach the temperature (the second calculation parameter T(t)). According to the third calculation method (the third calculating device), for example, convergence to a good solution is obtained even for a large initial momentum (the initial value $y_i(0)$ of the second variable y). It is easier to search in a wider range by using a large initial momentum.

According to the second calculation method (the second calculating device) and the third calculation method (the third calculating device), for example, the calculation accuracy can be increased.

In the third calculation method (the third calculating device), the second variable update may be performed in one node of the processor 20 (one part of the processor 20). In such a case, $<y^2>_i$ recited above (the mean square of the first to Nth entry of the second variables $y_1$ to $y_N$) may be derived by the one node (the one part of the processor 20). For example, the communications between the multiple nodes (the multiple parts) can be omitted.

Second Embodiment

A second embodiment includes a circuit in which the calculation described in reference to the first embodiment is possible.

Third Embodiment

A third embodiment relates to a calculation program. The calculation program causes a computer to repeat a processing procedure. The processing procedure includes the first variable update and the second variable update.

The first variable update includes updating the ith entry of the first variable $x_i$ by adding the ith entry of the first function to the ith entry of the first variable $x_i$ before the first variable update (1 being an integer not less than 1 and not more than N, and N being an integer of 2 or more). The ith entry of the first variable $x_i$ is one of the first variable set {x}. The variable of the ith entry of the first function includes the ith entry of the second variable $y_i$. The ith entry of the second variable $y_i$ is one of the second variable set $\{y\}$. The ith entry of the first function is one of the first function set. The second variable update includes updating the ith entry of the second variable $y_i$ by adding the ith entry of the second function and the ith entry of the third function to the ith entry of the second variable $y_i$ before the second variable update. The variable of the ith entry of the second function includes the ith entry of the first variable $x_i$. The variable of the ith entry of the third function includes at least a part of the first parameter set $\{J\}$ and at least a part of the first variable set $\{x\}$. The ith entry of the second function is one of the second function set. The ith entry of the third function is one of the third function set. The variable of the first function set includes a calculation parameter that is different before and after the processing procedure. The calculation program causes the computer to output at least one of the ith entry of the first variable $x_i$ obtained after repeating the processing procedure or a function of the ith entry of the first variable $x_i$ obtained after repeating the processing procedure.

The processing described in reference to the first embodiment and the second embodiment is applicable to the calculation program according to the embodiment.

Fourth Embodiment

A fourth embodiment is a computer-readable recording medium. A program that causes a computer to repeat a processing procedure is recorded in the recording medium. The processing procedure includes the first variable update and the second variable update.

The first variable update includes updating the ith entry of the first variable $x_i$ by adding the ith entry of the first function to the ith entry of the first variable $x_i$ before the first variable update (i being an integer not less than 1 and not more than N, and N being an integer of 2 or more). The ith entry of the first variable $x_i$ is one of the first variable set $\{x\}$; and the variable of the ith entry of the first function includes the ith entry of the second variable $y_i$. The ith entry of the second variable $y_i$ is one of the second variable set $\{y\}$. The ith entry of the first function is one of the first function set. The second variable update includes updating the ith entry of the second variable $y_i$ by adding the ith entry of the second function and the ith entry of the third function to the ith entry of the second variable $y_i$ before the second variable update. The variable of the ith entry of the second function includes the ith entry of the first variable $x_i$. The variable of the ith entry of the third function includes at least a part of the first parameter set $\{J\}$ and at least a part of the first variable set $\{x\}$. The ith entry of the second function is one of the second function set. The ith entry of the third function is one of the third function set. The variable of the first function set includes a calculation parameter that is different before and after the processing procedure. The program causes the computer to output at least one of the ith entry of the first variable $x_i$ obtained after repeating the processing procedure or a function of the ith entry of the first variable $x_i$ obtained after repeating the processing procedure.

The processing described in reference to the first embodiment and the second embodiment is applicable to the recording medium according to the embodiment.

Fifth Embodiment

The embodiment relates to a calculation method. The calculation method repeats a processing procedure. The processing procedure includes the first variable update and the second variable update.

The first variable update includes updating the ith entry of the first variable $x_i$ by adding the ith entry of the first function to the ith entry of the first variable $x_i$ before the first variable update (i being an integer not less than 1 and not more than N, and N being an integer of 2 or more). The ith entry of the first variable $x_i$ is one of the first variable set $\{x\}$. The variable of the ith entry of the first function includes the ith entry of the second variable $y_i$. The ith entry of the second variable $y_i$ is one of the second variable set $\{y\}$. The second variable update includes updating the ith entry of the second variable $y_i$ by adding the second function and the third function to the ith entry of the second variable $y_i$ before the second variable update. The variable of the second function includes the ith entry of the first variable $x_i$. The variable of the third function includes at least a part of the first parameter set $\{J\}$ and at least a part of the first variable set $\{x\}$.

The calculation method outputs at least one of the ith entry of the first variable $x_i$ obtained after repeating the processing procedure or a function of the ith entry of the first variable $x_i$ obtained after repeating the processing procedure.

For example, the processing (the instructions) of the various information (the data) recited above is performed based on a program (software). For example, the processing of the various information recited above is performed by a computer storing the program and reading the program.

The processing of the various information recited above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another recording medium.

For example, the information that is recorded in the recording medium can be read by a computer (or an embedded system). The recording format (the storage format) of the recording medium is arbitrary. For example, the computer reads the program from the recording medium and causes the CPU to execute the instructions described in the program based on the program. In the computer, the acquisition (or the reading) of the program may be performed via a network.

At least a part of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium of the embodiments also includes a recording medium to which a program obtained using a LAN, the Internet, etc., is downloaded and stored. The processing recited above may be performed based on multiple recording media.

The computer according to the embodiments includes one or multiple devices (e.g., personal computers, etc.). The computer according to the embodiments may include multiple devices connected by a network.

The embodiments may include, for example, the following configurations (e.g., technological proposals).

Configuration 1

A calculating device, comprising a processor repeating a processing procedure, the processing procedure including a first variable update and a second variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the ith entry of the first function including an ith entry of a second variable $y_i$, the ith entry of the second variable $y_i$ being one of a second variable set $\{y\}$, the ith entry of the first function being one of a first function set, the second variable update including updating the ith entry of the second variable $y_i$ by adding an ith entry of a second function and an ith entry of a third function to the ith entry of the second variable $y_i$ before the second variable update, a variable of the ith entry of the second function including the ith entry of the first variable z, a variable of the ith entry of the third function including at least a part of a first parameter set $\{J\}$ and at least a part of the first variable set $\{x\}$, the ith entry of the second function being one of a second function set, the ith entry of the third function being one of a third function set, a variable of the first function set including a calculation parameter, the calculation parameter being different before and after the processing procedure, the processor performing at least an output of at least one of the ith entry of the first variable z obtained after the repeating of the processing procedure or a function of the ith entry of the first variable $x_i$ obtained after the repeating of the processing procedure.

Configuration 2

The calculating device according to Configuration 1, wherein the calculation parameter includes a first calculation parameter, the variable of the ith entry of the first function includes a product of the ith entry of the second variable $y_i$ and the first calculation parameter, and the first calculation parameter after the processing procedure is smaller than the first calculation parameter before the processing procedure.

Configuration 3

The calculating device according to Configuration 1, wherein the calculation parameter includes a first calculation parameter, the ith entry of the first function is a product of the ith entry of the second variable $y_i$ and the first calculation parameter, and the first calculation parameter after the processing procedure is smaller than the first calculation parameter before the processing procedure.

Configuration 4

The calculating device according to Configuration 1, wherein the calculation parameter includes a second calculation parameter, the variable of the ith entry of the first function includes a difference between the second calculation parameter and a mean square of at least a part of the second variable set $\{y\}$, the at least a part of the second variable set $\{y\}$ includes the ith entry of the second variable $y_i$, and the second calculation parameter after the processing procedure is not more than the second calculation parameter before the processing procedure.

Configuration 5

The calculating device according to Configuration 1, wherein the calculation parameter includes a second calculation parameter and a third calculation parameter, the variable of the ith entry of the first function includes a product of the ith entry of the second variable $y_i$, the third calculation parameter, and a difference between the second calculation parameter and a mean square of at least a part of the second variable set $\{y\}$, the at least a part of the second variable set $\{y\}$ includes the ith entry of the second variable $y_i$, the second calculation parameter after the processing procedure is not more than the second calculation parameter before the processing procedure, and the third calculation parameter after the processing procedure is not more than the third calculation parameter before the processing procedure.

Configuration 6

The calculating device according to Configuration 4 or 5, wherein one part of the processor performs an update of a part of the second variable set $\{y\}$ and a calculation of a mean square relating to the part of the second variable set $\{y\}$, and an other one part of the processor performs an update of an other part of the second variable set $\{y\}$ and a calculation of a mean square relating to the other part of the second variable set $\{y\}$.

Configuration 7

The calculating device according to Configuration 6, wherein at least a part of the performing of the update of the part of the second variable set $\{y\}$ and the calculation of the mean square relating to the part of the second variable set $\{y\}$ is performed simultaneously with at least a part of the performing of the update of the other part of the second variable set $\{y\}$ and the calculation of the mean square relating to the other part of the second variable set $\{y\}$.

Configuration 8

The calculating device according to any one of Configurations 4 to 7, wherein an initial value of the second calculation parameter is substantially the same as the mean square.

Configuration 9

The calculating device according to any one of Configurations 1 to 8, wherein a mean square of an initial value of the second variable set $\{y\}$ is greater than 0.1 times a mean square of a final value of the first variable set $\{x\}$.

Configuration 10

The calculating device according to any one of Configurations 1 to 9, wherein the first function set is independent of the first variable set $\{x\}$, the second function set is independent of the second variable set $\{y\}$, the third function set is independent of the second variable set $\{y\}$, and in one of the processing procedures, the second variable update is performed after the first variable update, or the first variable update is performed after the second variable update.

Configuration 11

The calculating device according to any one of Configurations 1 to 9, wherein the first function set is independent of the first variable set $\{x\}$, the second function set is independent of the second variable set $\{y\}$, the third function set is independent of the second variable set $\{y\}$, the second variable update includes a first sub-update and a second sub-update, the first sub-update includes updating the ith entry of the second variable $y_i$ by adding the ith entry of the second function to the ith entry of the second variable $y_i$ before the first sub-update, the second sub-update includes updating the ith entry of the second variable $y_i$ by adding the ith entry of the third function to the ith entry of the second variable $y_i$ before the second sub-update, and the second sub-update is performed after the first variable update and the first sub-update are performed alternately M times (M being an integer of 2 or more); or the first variable update and the first sub-update are performed alternately M times after the second sub-update.

Configuration 12

The calculating device according to any one of Configurations 1 to 11, wherein the ith entry of the third function includes a product-sum operation of the at least a part of the first parameter set $\{J\}$ and the at least a part of the first variable set $\{x\}$.

Configuration 13

The calculating device according to any one of Configurations 1 to 12, wherein the ith entry of the second function includes an ith entry of a fourth function having the ith entry of the first variable $x_i$ as a variable, the ith entry of the fourth function includes a nonlinear function of the first variable $x_i$, the ith entry of the fourth function includes an operation parameter p, the operation parameter p changes when the processing procedure is repeated, and a number of real roots of the ith entry of the fourth function after repeating the processing procedure is different from a number of real roots of the ith entry of the fourth function before repeating the processing procedure.

Configuration 14

The calculating device according to any one of Configurations 1 to 13, wherein the number of roots of the ith entry of the fourth function after repeating the processing procedure is 2 or more, one of the roots of the ith entry of the fourth function after repeating the processing procedure is positive, an other one of the roots of the ith entry of the fourth function after repeating the processing procedure is negative, and the processor outputs at least a sign of the ith entry of the first variable $x_i$ obtained after the repeating of the processing procedure.

Configuration 15

The calculating device according to any one of Configurations 1 to 14, wherein the ith entry of the second function includes an ith entry of a second parameter $h_i$, and the ith entry of the second parameter $h_i$ is one of a second parameter set $\{h\}$.

Configuration 16

The calculating device according to any one of Configurations 1 to 15, wherein the first variable update includes acquiring, from a storer, the ith entry of the first variable $x_i$ before the first variable update, and storing, in the storer, the ith entry of the first variable $x_i$ after the first variable update, and the second variable update includes acquiring, from the storer, the ith entry of the second variable $y_i$ before the second variable update, and storing, in the storer, the ith entry of the second variable $y_i$ after the second variable update.

Configuration 17

The calculating device according to Configuration 16, wherein the first variable update further includes acquiring at least a part of the second variable set $\{y\}$ from the storer, calculating the ith entry of the first function, and updating the ith entry of the first variable $x_i$ by adding the ith entry of the first function to the ith entry of the first variable $x_i$, and the second variable update further includes acquiring the ith entry of the first variable $x_i$ from the storer, calculating the ith entry of the second function, acquiring the at least a part of the first parameter set $\{J\}$ and the at least a part of the first variable set $\{x\}$ from the storer, calculating the ith entry of the third function, and updating the ith entry of the second variable $y_i$ by adding the ith entry of the second function and the ith entry of the third function to the ith entry of the second variable $y_i$.

Configuration 18

The calculating device according to Configuration 16 or 17, further comprising the storer.

Configuration 19

The calculating device according to any one of Configurations 16 to 18, wherein the processor includes a first calculator and a second calculator, the first calculator performs a part of a calculation of the third function, the second calculator performs an other part of the calculation of the third function, and at least a part of the performing of the part of the calculation of the third function by the first calculator and at least a part of the performing of the other part of the calculation of the third function by the second calculator are performed simultaneously.

Configuration 20

The calculating device according to any one of Configurations 16 to 19, wherein the storer includes a first storage region and a second storage region, the first parameter set $\{J\}$ includes a first-calculation-used part and a second-calculation-used part, the first-calculation-used part being used in the part of the calculation of the third function, the second-calculation-used part being used in the other part of the calculation of the third function, the first calculator stores the first-calculation-used part in the first storage region, and the second calculator stores the second-calculation-used part in the second storage region.

Configuration 21

The calculating device according to any one of Configurations 15 to 19, wherein the processor includes a third calculator and a fourth calculator, the third calculator performs a part of a calculation of the first variable update and a part of a calculation of the second function, the fourth calculator performs an other part of the calculation of the first variable update and an other part of the calculation of the second function, and at least a part of the performing by the third calculator and at least a part of the performing by the fourth calculator are performed simultaneously.

Configuration 22

A calculation program causing a computer to repeat a processing procedure, the processing procedure including a first variable update and a second variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the ith entry of the first function including an ith entry of a second variable $y_i$, the ith entry of the second variable $y_i$ being one of a second variable set $\{y\}$, the ith entry of the first function being one of a first function set, the second variable update including updating the ith entry of the second variable $y_i$ by adding an ith entry of a second function and an ith entry of a third function to the ith entry of the second variable $y_i$ before the second variable update, a variable of the ith entry of the second function including the ith entry of the first variable $x_i$, a variable of the ith entry of the third function including at least a part of a first parameter set $\{J\}$ and at least a part of the first variable set $\{x\}$, the ith entry of the second function being one of a second function set, the ith entry of the third function being one of a third function set, a variable of the first function set including a calculation parameter, the calculation parameter being different before and after the processing procedure, the computer being caused to output at least one of the ith entry of the first variable $x_i$ obtained after the repeating of the processing procedure or a function of the ith entry of the first variable $x_i$ obtained after the repeating of the processing procedure.

Configuration 23

A recording medium, the recording medium being computer-readable, a calculation program being recorded in the recording medium, the calculation program causing a computer to repeat a processing procedure, the processing procedure including a first variable update and a second variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the ith entry of the first function including the ith entry of the second variable $y_i$, the ith entry of the second variable $y_i$ being one of a second variable set $\{y\}$, the ith entry of the first function being one of a first function set, the second variable update including updating the ith entry of the second variable $y_i$ by adding an ith entry of a second function and an ith entry of a third function to the ith entry of the second variable $y_i$ before the second variable update, a variable of the ith entry of the second function including the ith entry of the first variable $x_i$, a variable of the ith entry of the third function including at least a part of a first parameter set $\{J\}$ and at least a part of the first variable set $\{x\}$, the ith entry of the second function being one of a second function set, the ith entry of the third function being one of a third function set, a variable of the first function set including a calculation parameter, the calculation parameter being different before and after the processing procedure, the computer being caused to output at least one of the ith entry of the first variable $x_i$ obtained after the repeating of the processing procedure or a function of the ith entry of the first variable $x_i$ obtained after the repeating of the processing procedure.

Configuration 24

A calculation method, comprising repeating a processing procedure, the processing procedure including a first variable update and a second variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the ith entry of the first function including the ith entry of the second variable $y_i$, the ith entry of the second variable $y_i$ being one of a second variable set $\{y\}$, the ith entry of the first function being one of a first function set, the second variable update including updating the ith entry of the second variable $y_i$ by adding an ith entry of a second function and an ith entry of a third function to the ith entry of the second variable $y_i$ before the second variable update, a variable of the ith entry of the second function including the ith entry of the first variable $x_i$, a variable of the ith entry of the third function including at least a part of a first parameter set $\{J\}$ and at least a part of the first variable set $\{x\}$, the ith entry of the second function being one of a second function set, the ith entry of the third function being one of a third function set, a variable of the first function set including a calculation parameter, the calculation parameter being different before and after the processing procedure, the calculation method including outputting at least one of the ith entry of the first variable $x_i$ obtained after the repeating of the processing procedure or a function of the ith entry of the first variable $x_i$ obtained after the repeating of the processing procedure.

According to the embodiments, a calculating device, a calculation program, a recording medium, and a calculation method can be provided in which an optimization problem can be calculated quickly.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in calculating devices such as processors, acquirers, storers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all calculating devices, calculation programs, recording media, and calculation methods practicable by an appropriate design modification by one skilled in the art based on the calculating devices, the calculation programs, recording media, and the calculation methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A calculating device, comprising:
a plurality of processors configured to perform a processing procedure, the plurality of processors comprising a first circuit, a second circuit, and a control circuit, the first circuit and the second circuit being coupled with each other and with the control circuit,
the processing procedure including a first variable update and a second variable update,
the first variable update including updating an ith entry of a first variable $x_i$ by adding an ith entry of a first function to the ith entry of the first variable $x_i$ (i being an integer not less than one and not more than N, and N being an integer of two or more), the ith entry of the first variable $x_i$ being one of a first variable set $\{x\}$, a variable of the ith entry of the first function including an ith entry of a second variable $y_i$, the ith entry of the second variable $y_i$ being one of a second variable set $\{y\}$, the ith entry of the first function being one of a first function set,
the second variable update including updating the ith entry of the second variable $y_i$ by adding an ith entry of a second function and an ith entry of a third function to the ith entry of the second variable $y_i$, a variable of the ith entry of the second function including the ith entry of the first variable $x_i$, a variable of the ith entry of the third function including at least a part of a first parameter set $\{J\}$ and at least a part of the first variable set $\{x\}$, the ith entry of the second function being one of a second function set, the ith entry of the third function being one of a third function set, a variable of the first function set including a calculation parameter, the calculation parameter being different before and after the processing procedure,
the plurality of processors being configured to output of at least one of the ith entry of the first variable $x_i$ obtained after the processing procedure or a function of the ith entry of the first variable $x_i$ obtained after the processing procedure,
wherein:
the first circuit is configured to store a part of the first parameter set $\{J\}$ on a first storage region and perform a part of a calculation of the third function;
the second circuit is configured to store another part of the first parameter set $\{J\}$ on a second storage region and perform another part of the calculation of the third function; and
the first circuit performs the part of the calculation of the third function simultaneously as the second circuit performs the another part of the calculation of the third function.

2. The device according to claim 1, wherein:
the calculation parameter includes a first calculation parameter,
the variable of the ith entry of the first function includes a product of the ith entry of the second variable $y_i$ and the first calculation parameter, and
the first calculation parameter after the processing procedure is smaller than the first calculation parameter before the processing procedure.

3. The device according to claim 1, wherein:
the calculation parameter includes a first calculation parameter,
the ith entry of the first function is a product of the ith entry of the second variable $y_i$ and the first calculation parameter, and
the first calculation parameter after the processing procedure is smaller than the first calculation parameter before the processing procedure.

4. The device according to claim 1, wherein:
the calculation parameter includes a second calculation parameter,
the variable of the ith entry of the first function includes a difference between the second calculation parameter and a mean square of at least a part of the second variable set $\{y\}$,
the at least a part of the second variable set $\{y\}$ includes the ith entry of the second variable $y_i$, and
the second calculation parameter after the processing procedure is not more than the second calculation parameter before the processing procedure.

5. The device according to claim 4, wherein:
the first circuit is configured to perform an update of a part of the second variable set $\{y\}$ and a calculation of a mean square relating to the part of the second variable set $\{y\}$, and
the second circuit is configured to perform an update of another part of the second variable set $\{y\}$ and a calculation of a mean square relating to the other part of the second variable set $\{y\}$.

6. The device according to claim 5, wherein at least a part of the performing of the update of the part of the second variable set $\{y\}$ and the calculation of the mean square relating to the part of the second variable set $\{y\}$ is performed simultaneously with at least a part of the performing of the update of the other part of the second variable set $\{y\}$ and the calculation of the mean square relating to the other part of the second variable set $\{y\}$.

7. The device according to claim 4, wherein an initial value of the second calculation parameter is substantially the same as the mean square.

8. The device according to claim 1, wherein:
the calculation parameter includes a second calculation parameter and a third calculation parameter,
the variable of the ith entry of the first function includes a product of the ith entry of the second variable $y_i$, the third calculation parameter, and a difference between the second calculation parameter and a mean square of at least a part of the second variable set $\{y\}$,
the at least a part of the second variable set $\{y\}$ includes the ith entry of the second variable $y_i$,
the second calculation parameter after the processing procedure is not more than the second calculation parameter before the processing procedure, and
the third calculation parameter after the processing procedure is not more than the third calculation parameter before the processing procedure.

9. The device according to claim 1, wherein a mean square of an initial value of the second variable set $\{y\}$ is greater than 0.1 times a mean square of a final value of the first variable set $\{x\}$.

10. The device according to claim 1, wherein:
the first function set is independent of the first variable set $\{x\}$, the second function set is independent of the second variable set {y},
the third function set is independent of the second variable set {y}, and
at least one of the second variable update is performed after the first variable update or the first variable update is performed after the second variable update.

11. The device according to claim 1, wherein:
the first function set is independent of the first variable set {x},
the second function set is independent of the second variable set {y},
the third function set is independent of the second variable set {y},
the second variable update includes a first sub-update and a second sub-update,
the first sub-update includes updating the ith entry of the second variable $y_i$ by adding the ith entry of the second function to the ith entry of the second variable $y_i$-,
the second sub-update includes updating the ith entry of the second variable $y_i$ by adding the ith entry of the third function to the ith entry of the second variable $y_i$-, and
at least one of the second sub-update is performed after the first variable update and the first sub-update are performed alternately M times (M being an integer of two or more) or the first variable update and the first sub-update are performed alternately M times after the second sub-update.

12. The device according to claim 1, wherein the ith entry of the third function includes a product-sum operation of the at least a part of the first parameter set {J} and the at least a part of the first variable set {x}.

13. The device according to claim 1, wherein:
the ith entry of the second function includes an ith entry of a fourth function having the ith entry of the first variable $x_i$ as a variable,
the ith entry of the fourth function includes a nonlinear function of the first variable $x_i$,
the ith entry of the fourth function includes an operation parameter p,
the operation parameter p changes when the processing procedure is repeated, and
a number of real roots of the ith entry of the fourth function after repeating the processing procedure is different from a number of real roots of the ith entry of the fourth function before repeating the processing procedure.

14. The device according to claim 1, wherein:
a number of roots of the ith entry of the fourth function after repeating the processing procedure is two or more,
one of the roots of the ith entry of the fourth function after repeating the processing procedure is positive,
another one of the roots of the ith entry of the fourth function after repeating the processing procedure is negative, and
the plurality of processors output at least a sign of the ith entry of the first variable $x_i$ obtained after the processing procedure.

15. The device according to claim 1, wherein:
the ith entry of the second function includes an ith entry of a second parameter $h_i$, and
the ith entry of the second parameter $h_i$ is one of a second parameter set {h}.

16. The device according to claim 15, wherein:
the plurality of processors further comprise a third circuit and a fourth circuit,
the third circuit performs a part of a calculation of the first variable update and a part of a calculation of the second function,
the fourth circuit performs another part of the calculation of the first variable update and another part of the calculation of the second function, and
at least a part of the performing by the third circuit and at least a part of the performing by the fourth circuit are performed simultaneously.

17. The device according to claim 1, wherein:
the first variable update includes acquiring, from a storer, the ith entry of the first variable $x_i$ before the first variable update, and storing, in the storer, the ith entry of the first variable $x_i$ after the first variable update, and
the second variable update includes acquiring, from the storer, the ith entry of the second variable $y_i$ before the second variable update, and storing, in the storer, the ith entry of the second variable $y_i$ after the second variable update.

18. The device according to claim 17, wherein:
the first variable update further includes acquiring at least a part of the second variable set {y} from the storer, calculating the ith entry of the first function, and updating the ith entry of the first variable $x_i$ by adding the ith entry of the first function to the ith entry of the first variable $x_i$, and
the second variable update further includes acquiring the ith entry of the first variable $x_i$ from the storer, calculating the ith entry of the second function, acquiring the at least a part of the first parameter set {J} and the at least a part of the first variable set {x} from the storer, calculating the ith entry of the third function, and updating the ith entry of the second variable $y_i$ by adding the ith entry of the second function and the ith entry of the third function to the ith entry of the second variable $y_i$.

19. The device according to claim 17, wherein:
the storer includes the first storage region and the second storage region,
the first parameter set {J} includes a first-calculation-used part and a second-calculation-used part, the first-calculation-used part being used in the part of the calculation of the third function, the second-calculation-used part being used in the other part of the calculation of the third function,
the first circuit stores the first-calculation-used part in the first storage region, and
the second circuit stores the second-calculation-used part in the second storage region.

20. A system for resolving an Ising problem comprising:
one or more processors comprising a first circuit, a second circuit, and a control circuit, the first circuit and the second circuit being coupled with each other and with the control circuit; and
one or more memory devices storing instructions that configure the one or more processors to perform operations comprising:
performing a first variable update including updating an ith entry of a first variable $x_i$ by adding an ith entry of a first function to the ith entry of the first variable $x_i$ (i being an integer not less than one and not more than N, and N being an integer of two or more), the ith entry of the first variable $x_i$ being one of a first variable set {x}, a variable of the ith entry of the first function including an ith entry of a second variable $y_i$, the ith entry of the second variable $y_i$ being one of a second variable set $\{y\}$, the ith entry of the first function being one of a first function set;

performing a second variable update including updating the ith entry of the second variable $y_i$ by adding an ith entry of a second function and an ith entry of a third function to the ith entry of the second variable $y_i$, a variable of the ith entry of the second function including the ith entry of the first variable $x_i$, a variable of the ith entry of the third function including at least a part of a first parameter set $\{J\}$ and at least a part of the first variable set $\{x\}$, the ith entry of the second function being one of a second function set, the ith entry of the third function being one of a third function set, a variable of the first function set including a calculation parameter, the calculation parameter being different before and after the processing procedure, and outputting of at least one of the ith entry of the first variable $x_i$ obtained after the repeating of the processing procedure or a function of the ith entry of the first variable $x_i$ obtained after the repeating of the processing procedure, wherein:
- the first circuit is configured to store a part of the first parameter set $\{J\}$ on a first storage region and perform a part of a calculation of the third function;
- the second circuit is configured to store another part of the first parameter set $\{J\}$ on a second storage region and perform another part of the calculation of the third function; and
- the first circuit performs the part of the calculation of the third function simultaneously as the second circuit performs the another part of the calculation of the third function.

* * * * *